United States Patent [19]

Jeske et al.

[11] Patent Number: 5,845,045
[45] Date of Patent: Dec. 1, 1998

[54] METHOD AND APPARATUS FOR DC MOTOR SPEED CONTROL

[75] Inventors: Frank Jeske, Tennenbronn; Arno Karwath, Rottweil; Hermann Rappenecker, Vöhrenbach, all of Germany

[73] Assignee: Papst-Motoren GmbH & Co. KG, St. Georgen, Germany

[21] Appl. No.: 341,380

[22] Filed: Nov. 17, 1994

[30] Foreign Application Priority Data

Nov. 28, 1993 [DE] Germany ............ 43 40 248.8

[51] Int. Cl.⁶ .................................. H02P 5/06
[52] U.S. Cl. .................. 388/804; 388/806; 318/599; 318/609; 318/634; 318/685; 318/254; 318/439
[58] Field of Search ................... 388/804, 806, 388/811, 815, 819, 822, 833, 921; 318/599, 609, 634, 685, 696, 254, 439, 138; 361/28

[56] References Cited

U.S. PATENT DOCUMENTS

| Re. 33,379 | 10/1990 | Brodus ........................ 388/802 |
| 3,873,897 | 3/1975 | Müller et al. ................. 318/138 |
| 4,150,303 | 4/1979 | Armstrong .................. 318/484 X |

(List continued on next page.)

FOREIGN PATENT DOCUMENTS

| 0 084 156-A1 | 7/1983 | European Pat. Off. . |
| 0 142 837-A2 | 5/1985 | European Pat. Off. . |
| 0 142 837-A3 | 5/1986 | European Pat. Off. . |
| 0 301 366 A2 | 2/1989 | European Pat. Off. . |
| 0 425 479 A2 | 5/1991 | European Pat. Off. . |
| 0 240 455 B1 | 2/1993 | European Pat. Off. . |
| 0 534 447 A1 | 3/1993 | European Pat. Off. . |
| 0 649 217-A1 | 4/1995 | European Pat. Off. . |
| AS 23 21 650 | 11/1973 | Germany . |
| OS 22 25 442 | 12/1973 | Germany . |
| OS 23 46 380 | 11/1974 | Germany . |
| 30 12 833 A1 | 10/1981 | Germany . |
| 33 42 031 A1 | 5/1984 | Germany . |
| 33 41 731 A1 | 5/1985 | Germany . |
| 33 42 986-A1 | 6/1985 | Germany . |
| 37 40 551 A1 | 6/1988 | Germany . |
| 37 10 509-C1 | 11/1988 | Germany . |
| 37 24 895 | 2/1989 | Germany . |
| 40 32 988 C2 | 2/1993 | Germany . |
| 41 32 881 A1 | 7/1993 | Germany . |
| 2 092 780 | 8/1982 | United Kingdom . |
| 2 247 999 | 3/1992 | United Kingdom . |

OTHER PUBLICATIONS

Sakman, "A Brushless DC Motor Controlled by a Microprocessor with Examples for A Three–Phase Motor," in *IEEE Transactions on Industrial Electronics*, vol. IE–34, No. 3, Aug. '87, pp. 339–344.

Derwent, WPI English Abstract of MAHR DE–OS 37 24 895 = U.S.P. 4,882,523.

Derwent, WPI English Abstract of Von der Heide/PAPST EP 0 142 837 = DE–OS 33 41 731.

R.Mü(R+D Director, Papst–Motoren), "Zweipulsige kollectorlose Gleichstrommotoren" [Two–pulse collectorless DC motors] in *ASR–Digest für angewandte Antreibstechnik*, 1977.

Primary Examiner—Brian Sircus
Attorney, Agent, or Firm—Milton Oliver Ware, Fressola, Van Der Sluys & Adolphson LLP

[57] ABSTRACT

A memory device, e.g. a capacitor, is provided for a collectorless DC motor. This component is charged whenever a particular rotor position is reached. In so doing, a voltage value or quantity on this memory device is changed. This quantity is compared to another quantity, which is dependent on a desired parameter, e.g. ambient temperature or gas or dust concentration. A reference signal is produced when a particular reference criterion is satisfied. The difference between the beginning of this reference signal and a second predetermined rotor position, which follows the initial predetermined rotor position with respect to time, is measured, and on the basis of this measurement, the current flow of the collectorless DC motor is influenced or regulated. In particular, the current can be toggled on and off as the rotor passes certain predetermined positions.

40 Claims, 21 Drawing Sheets

U.S. PATENT DOCUMENTS

| | | | |
|---|---|---|---|
| 4,415,844 | 11/1983 | Mendenhall et al. | 318/254 |
| 4,514,667 | 4/1985 | Sakmann | 318/254 |
| 4,535,275 | 8/1985 | Müller et al. | 318/254 |
| 4,599,548 | 7/1986 | Schultz | 318/599 |
| 4,720,663 | 1/1988 | Welch et al. | 318/341 |
| 4,734,627 | 3/1988 | Koerner et al. | 318/254 |
| 4,739,240 | 4/1988 | MacMinn et al. | 318/696 |
| 4,748,386 | 5/1988 | Nakanishi et al. | 318/354 |
| 4,763,060 | 8/1988 | Takaharshi | 388/811 |
| 4,804,892 | 2/1989 | Müller et al. | 318/254 |
| 4,882,523 | 11/1989 | Mahr et al. | 318/254 |
| 4,979,055 | 12/1990 | Squires et al. | 360/69 |
| 5,017,846 | 5/1991 | Young et al. | 318/244 |
| 5,206,567 | 4/1993 | Sakurai et al. | 312/254 |
| 5,222,009 | 6/1993 | Scharnick et al. | 361/28 |
| 5,341,651 | 8/1994 | Inoue | 318/609 X |
| 5,349,275 | 9/1994 | Müller et al. | 318/254 |
| 5,867,155 | 9/1989 | Isaacson | 128/305 |

METHOD AND APPARATUS FOR DC MOTOR SPEED CONTROL

Cross-reference to related patent documents, the disclosures of which are incorporated by reference:
U.S. Pat. No. 3,873,897, Müller/Papst-Motoren, and German DE 23 46 380 C2;
U.S. Pat. No. 4,720,663, Welch, et al., corresponding to EP 0 240 455 B1;
U.S. Ser. No. 08/305,145, Karwath/Papst-Motoren, filed Sep. 13, 1994.

FIELD OF THE INVENTION

The present invention relates generally to a method of influencing the RPM of a collectorless DC motor, and to a DC motor for carrying out the method.

BACKGROUND

It is often desired to match the RPM of a collectorless DC motor automatically to specific external conditions or parameters. An example is matching the RPM to a measured temperature, when the motor is driving a fan or ventilator. If the temperature is measured by a sensor, it can happen that the sensor fails or that the connection from it gets broken, which makes it necessary for the motor to automatically reach a higher RPM, for example to avoid inadequate cooling. These and similar requirements must, however, be fulfilled by very simple and cost-effective means because expensive, complex solutions, which could certainly be adopted, would not find market acceptance. Often, it is demanded that such arrangements be fitted into the inside of the motor, which is technically difficult to achieve.

European patent application EP 425 479 A2, Müller/Papst-Motoren discloses a collectorless DC motor for a temperature-actuated fan, in which, as temperature declines, the end stage of the circuit shuts off for a longer period, resulting in a delay of turn-on, after the commutation instant, for a time period which is inversely proportional to the temperature. This basic concept is also employed advantageously in the present invention. For details, see col. 18, lines 19–33 of this EP document. Subsequently, this concept was patented in both the European Patent Office and the German Patent Office, cf. EP 0 240 455 B1 and DE 37 83 931 T2, Welch et al, published 7 OCT. 1987 and 3 FEB. 1993, or DE 40 32 988 C2, Komiyama et al, published 16 MAY 1991.

SUMMARY OF THE INVENTION

Accordingly, it is an object of the present invention to provide a new method of influencing the RPM of a collectorless DC motor, and a motor structure adapted for implementing the method.

Briefly, this is accomplished by the following steps: in the range of a first predetermined rotor position, a quantity, preferably the voltage on a capacitor, is set to an initial value and subsequently varied as a function of time; this quantity is compared with another quantity, which is preferably dependent upon a quantity to be influenced, e.g. upon a temperature, in order to generate a comparison signal upon satisfaction of a predetermined comparison criterion; the time difference or interval, between generation of the comparison signal and the instant of a second predetermined rotor position subsequent to the first predetermined rotor position, or a value related to this time difference, and the sign of this time difference, are detected; on the basis of this time difference and its sign, the switch-on and/or switch-off of the stator current of the DC motor is time-regulated according to at least one predetermined rule or control scheme.

Such a method can readily be implemented with simple means, e.g. a simple microprocessor, because the time difference between occurrence of the comparison signal and the instant of the second predetermined rotor position during normal operation of the motor equals approximately zero, and accordingly can be detected and evaluated digitally using a small-capacity counter. In other words, this time difference represents the difference between the desired or target RPM value and the actual RPM value, the so-called "deviation," and when this time difference becomes exactly zero, the motor is running at the desired rotary speed or RPM value. When this time difference does not equal zero, its sign represents the direction of the RPM deviation (too fast or too slow) and its absolute value is a measure of the size of the deviation, so that simple evaluation is possible.

It is particularly advantageous to so proceed, in accordance with the invention, that the memory component is set to the initial value, either directly after occurrence of the comparison signal or whenever the presence of the comparison signal coincides with a predetermined rotor position, or one of a plurality of predetermined rotor positions. Both measures are simple and facilitate certain measurement, but the resetting directly after occurrence of the comparison signal seems overall to provide better results. According to a further refinement of the invention, the beginning of the time-dependent modification of the quantity is started by the reaching of a predetermined rotor position or of one of a plurality of predetermined rotor positions. This start, from a predetermined rotor position, simplifies the subsequent evaluation to a very unusual degree, and thus greatly simplifies and accelerates operation according to the method of the invention.

Another acceleration of the execution of the method results from a method in which, during the detection of the time difference between occurrence of the comparison signal and the second predetermined rotor position (following the first predetermined rotor position), at least one control parameter, preferably the P-factor of a proportional control scheme, or the I-factor of an integral control scheme, is continuously varied to match the measured time difference and its sign, so that upon expiration of this time difference, a revised parameter is already on hand. The fact that the measurement of the time difference and the matching of the control parameter are not carried out sequentially, but rather parallel in time, means that, at the end of the measurement, the matched parameters are already available and can immediately be used for subsequent processing. Since, in a collectorless DC motor, all processes of a cycle should be executed within 360° el., this represents a very important and advantageous refinement of the invention.

In the same sense, it is another advantageous refinement of the method if, when the RPM of the motor is too high, the at least one parameter is varied in a first rotational angle range of the rotor and if, when the RPM of the motor is too low, the at least one parameter is varied in a second rotational angle range of the rotor. This makes optimal use of the time which is available during one rotation of the rotor through 360° el. One associates different rotational angle ranges with different calculation routines. Advantageously, one can so relate the calculation routine for the first rotational angle range with respect to the calculation routine for the second rotational angle range that one of the two calculation routines has priority over the other; usually, the routine for too-low RPM takes precedence.

Particularly well adapted for one- and two-strand motors is a method in which the calculation steps, e.g. for calculating an adjustment amount in the control scheme, or for the generation of an alarm signal indicating below-threshold RPM, are executed within a predetermined rotational angle range of the rotor in which at least one strand of the motor is current-less and preferably all strands of the motor are current-less.

A further solution of the aforementioned task is represented by a method with the following steps:
 a) In a time interval preceding current passage through a particular strand, the time interval between two successive commutation instants, or a value corresponding to this time difference—hereinafter called "commutation time value"—is detected and stored;
 b) Upon current passage through the strand, the time duration of the current passage is measured, approximately from the commutation forward;
 c) Upon reaching a time duration of current passage, which is smaller than the commutation time value by a predetermined time interval, the current flow through this strand is cut off. This method, which is particularly adapted for a motor whose rotor has trapezoidal magnetization with small (magnetization) gaps between the poles, reduces operating noise of the motor and also leads to a reduction of noise due to shut-off spikes or peaks. The aforementioned time duration can be varied according to the output signal of an RPM controller, which results in particularly quiet motor operation and, in the area of the end-stage transistors for the individual strands, one can provide delay means which slow down the process of shutting off the current.

A further solution to the aforementioned task is represented by a method with the following steps:
 a) Steps which are associated with a condition of too-low RPM are executed, at least partially, in at least a first predetermined rotational angle range of the rotor;
 b) Steps which are associated with a condition of too-high RPM are executed, at least partially, in at least a second predetermined rotational angle range of the rotor, which second rotational angle range differs from the first range.

This makes it possible for the various executions to optimally match the executions to be carried out during rotor rotation.

The step of resetting an integral factor in response to low motor temperature makes it possible to discriminate among the values of an integral factor which arise during low-RPM conditions and those which correspond to an irregular condition of the motor and lead within a very short time to a very high value of the integral factor, which then triggers corresponding remedy procedures. Such a remedy procedure is the subject-matter a refinement of the inventive method.

Another refinement is a version of the inventive method, by means of which a blocked condition of the motor can be recognized, leading to an automatic shutoff.

A fundamental method of the invention makes possible simultaneous control of the processes and measurement of the time interval; one allots a predetermined length of time to a program loop. This is further elaborated below, and makes possible a number of very interesting solutions.

Further features of this motor are the subject-matters of claims 29 through 32.

Further details and advantageous refinements of the invention are set forth in the following description and associated drawings of preferred embodiments, which are not to be construed as limiting, but only as examples.

BRIEF FIGURE DESCRIPTION

Figure 1:
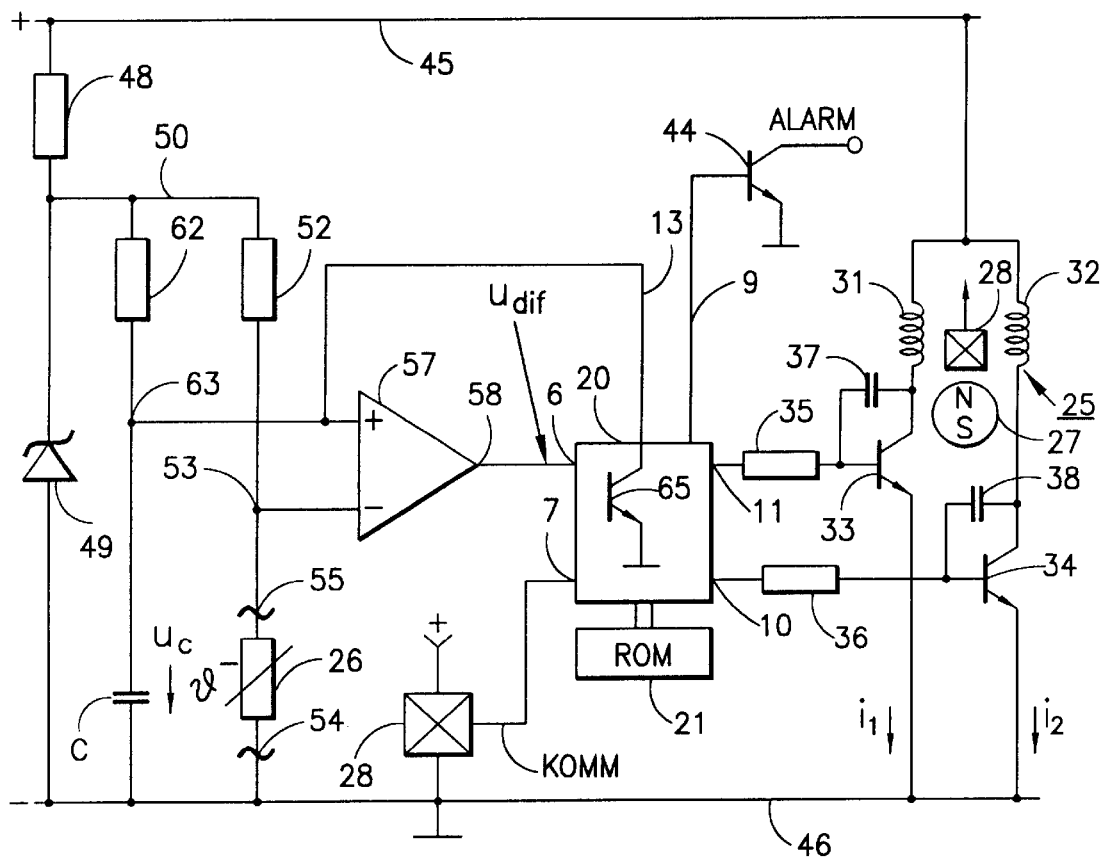
FIG. 1 is a schematic diagram of a preferred embodiment of the collectorless DC motor of the present invention.
Figure 12:
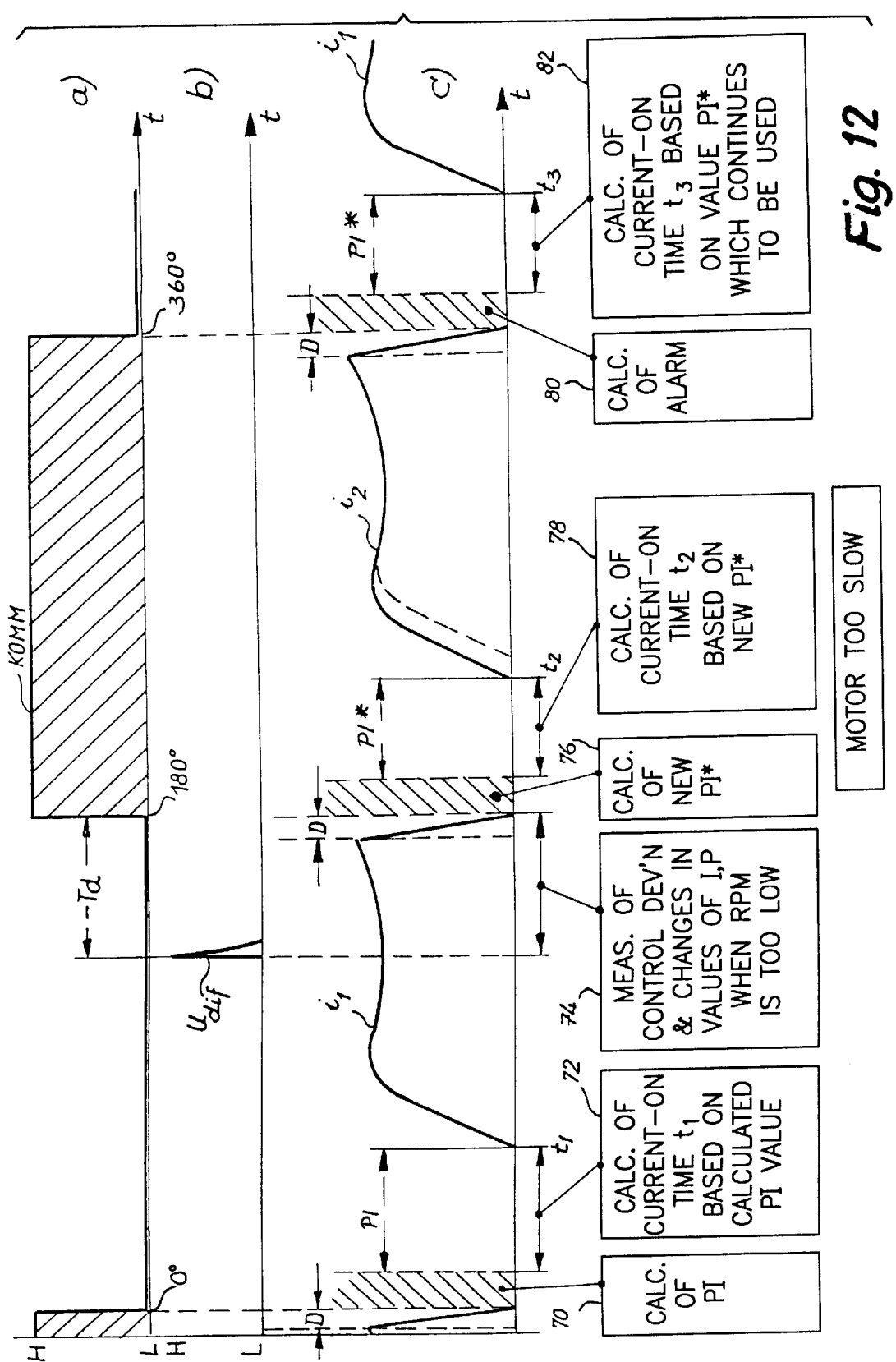
FIG. 12 represents how, depending upon the rotary position of the rotor, various routines are executed by the microprocessor, and, specifically, in the case that the RPM is too low.
Figure 24:
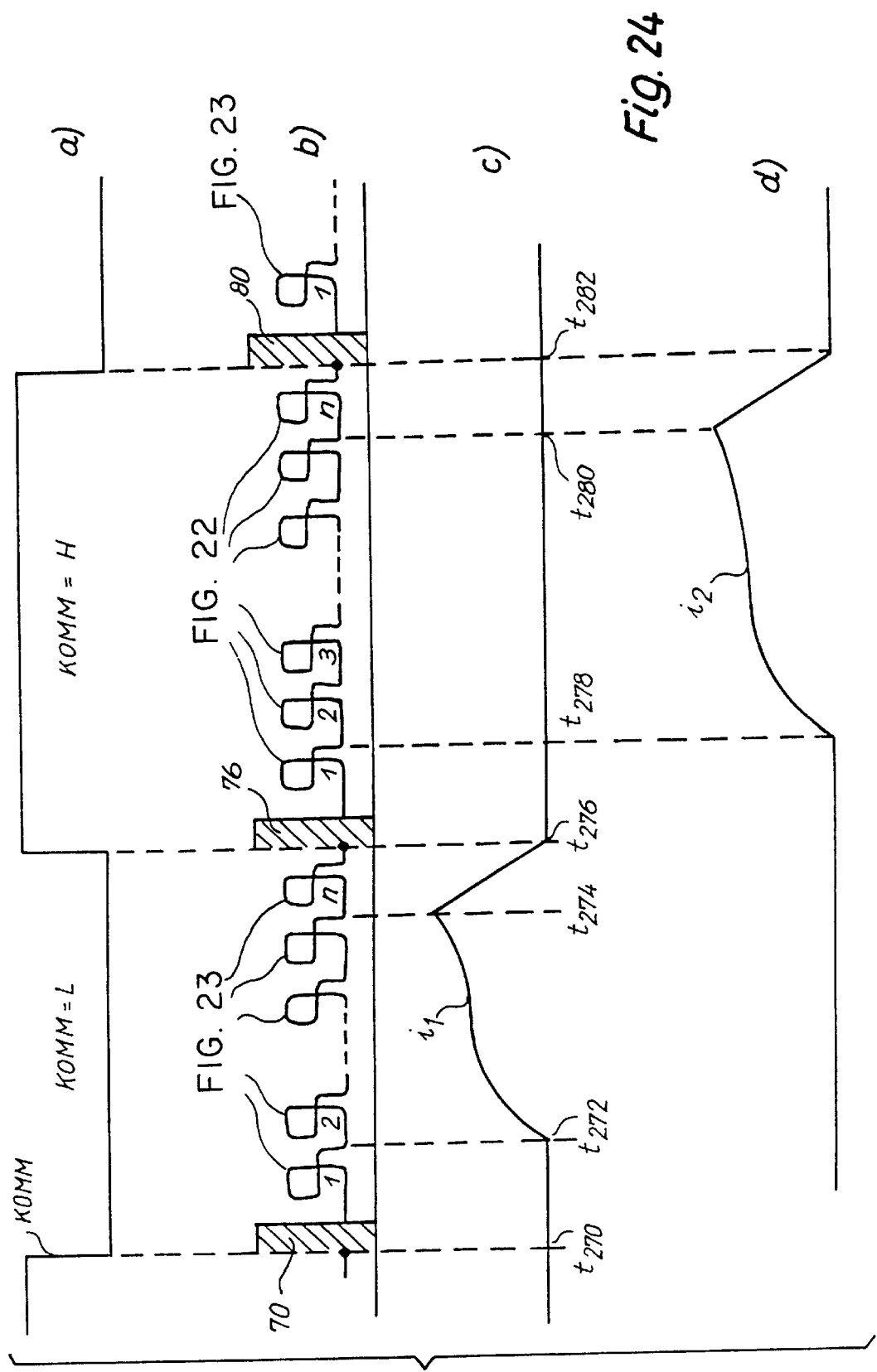
Figure 25:
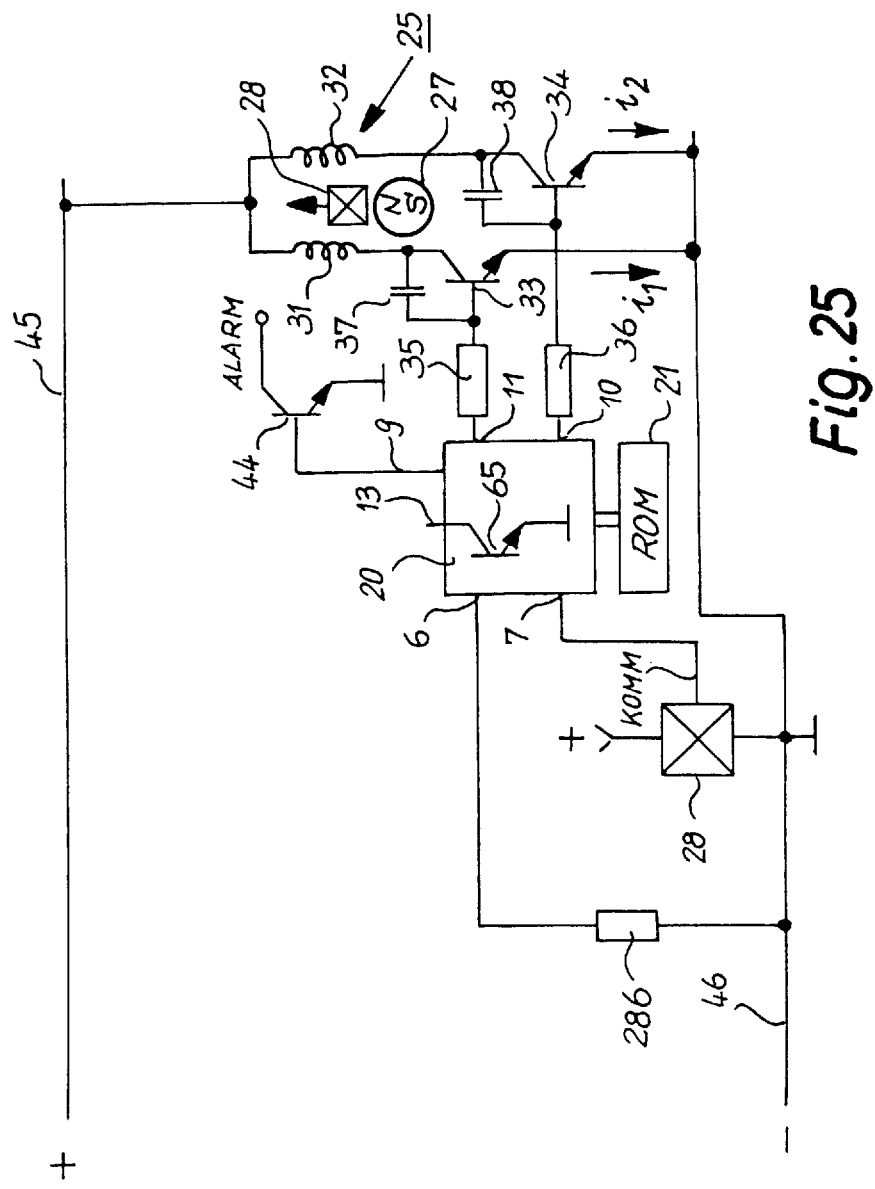

FIG. 24 is a diagram analogous to FIG. 12 to illustrate the processes which occur upon consecutive commutation phases; and FIG. 25 is a circuit diagram analogous to FIG. 1 for the case that the motor is driven only at its maximum RPM, i.e. without RPM regulation, but the alarm function, the protection against blockage, and the power-less on- and off-switching operate just as in FIG. 1, i.e. the program sequence for this case remains unchanged with respect to that of FIG. 1.

DETAILED DESCRIPTION

FIG. 1 illustrates the basic principle of the invention, in a highly schematic representation. Reference numeral 20 designates a microprocessor, which has an associated Read Only Memory or ROM 21, in which the commands necessary for operation of a motor 25 are stored. These commands, and the operations controlled by them, are explained below, with reference to accompanying flowcharts.

Figure 5:
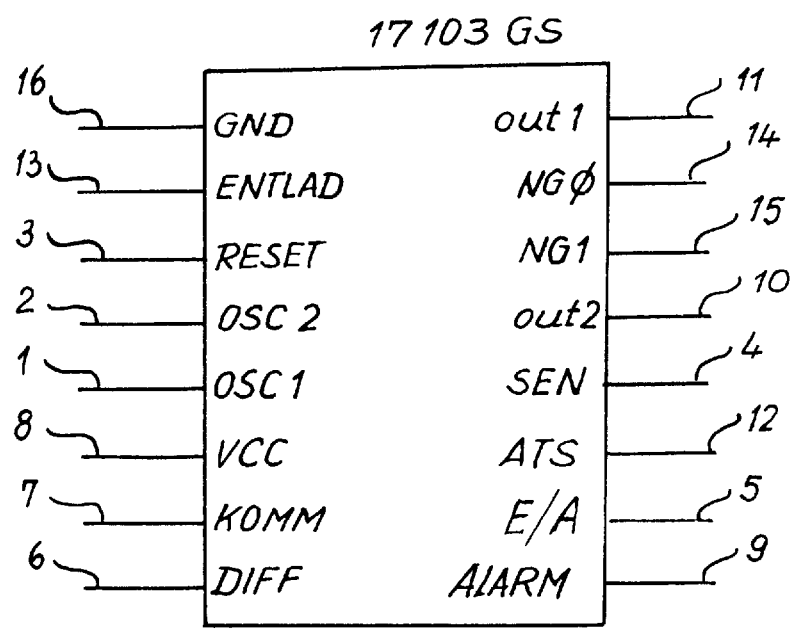
FIG. 5 illustrates details of a microprocessor used in a preferred embodiment of the invention.

FIG. 5 illustrates the terminals of a microprocessor of type 17103GS which can be used in the present invention. This microprocessor 20 contains a ROM with a memory capacity of 512 words, each 16 bits long. Therefore, this ROM is not shown separately. The terminals of this microprocessor and their designations may be taken directly from FIG. 5 and therefore need not be further described. The designations of FIG. 5 are also used in FIG. 1, so one can refer to the explanation of FIG. 5. The designations refer to the type 17103GS, a conventional single-chip microcontroller with four-bit data width, sold by NEC Corp.

Figure 2:
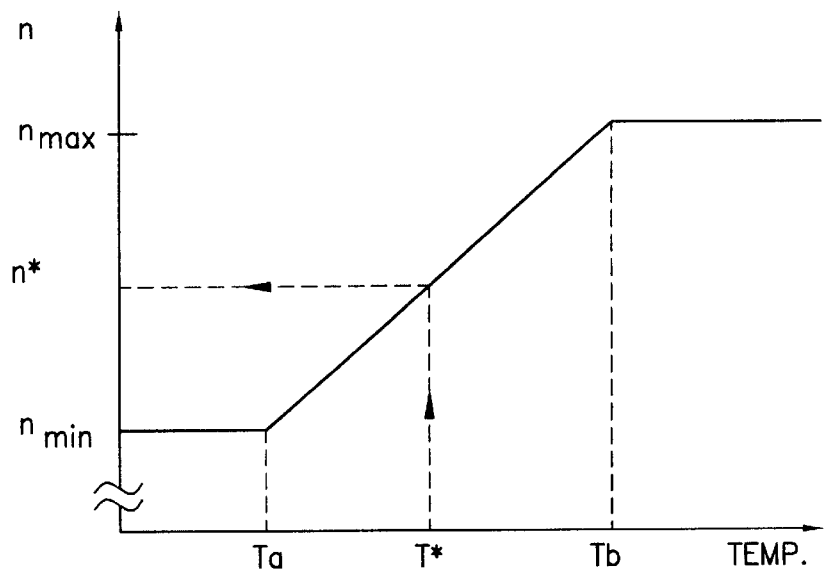
FIG. 2 is an idealized plot of the course of RPM versus temperature which is desired in a temperature-controlled fan.

The objective of the circuit, according to FIG. 1, is to control motor 25 in accordance with the temperature such that the motor runs at a low RPM "n" at low temperatures, and at a high RPM at high temperatures. One known application of such a motor is when used as an instrument fan drive. FIG. 2 illustrates a preferred plot of the course of RPM versus temperature; it requires no additional explanation. The motor speed n is limited to a minimum RPM value $n_{min}$, for instance, to the value $n_{min}$ shown, and to a maximum RPM value $n_{max}$, which means the motor speed can fluctuate between 1400 and 2800 RPM, if it is an instrument fan. Generally, the maximum speed is required for temperatures above 50° C. This maximum speed is the highest possible speed of the motor 25 and is generally not controlled, but could be controlled within the scope of the invention. The circuit according to FIG. 1 also lends itself to use as a constant speed regulator. All that is needed is to replace the Negative Temperature Coefficient (NTC) resistor with a constant resistor.

If the RPM of the motor falls way below the lower limit, possibly due to a bearing failure, it is desirable that the circuit produces an alarm signal to prevent damage from overheating, if the motor drives a fan and the fan does not supply enough air due to the low speed. It is also desired that such a motor automatically runs at the maximum RPM $n_{max}$, if a temperature sensor failure occurs. An NTC resistor serves as temperature sensor 26 in this example. For instance, if the temperature sensor circuit is open, e.g. due to a broken lead, a signal for low RPM would be generated in the circuit, which would result in the speed $n_{min}$, according to the logic of the control circuit. In the present invention, this signal corresponds to the speed $n_{max}$. In addition, it is often desirable, if a blocked condition of the motor is recognized ("lock-up protection"), to automatically shut off the motor.

Figure 6:
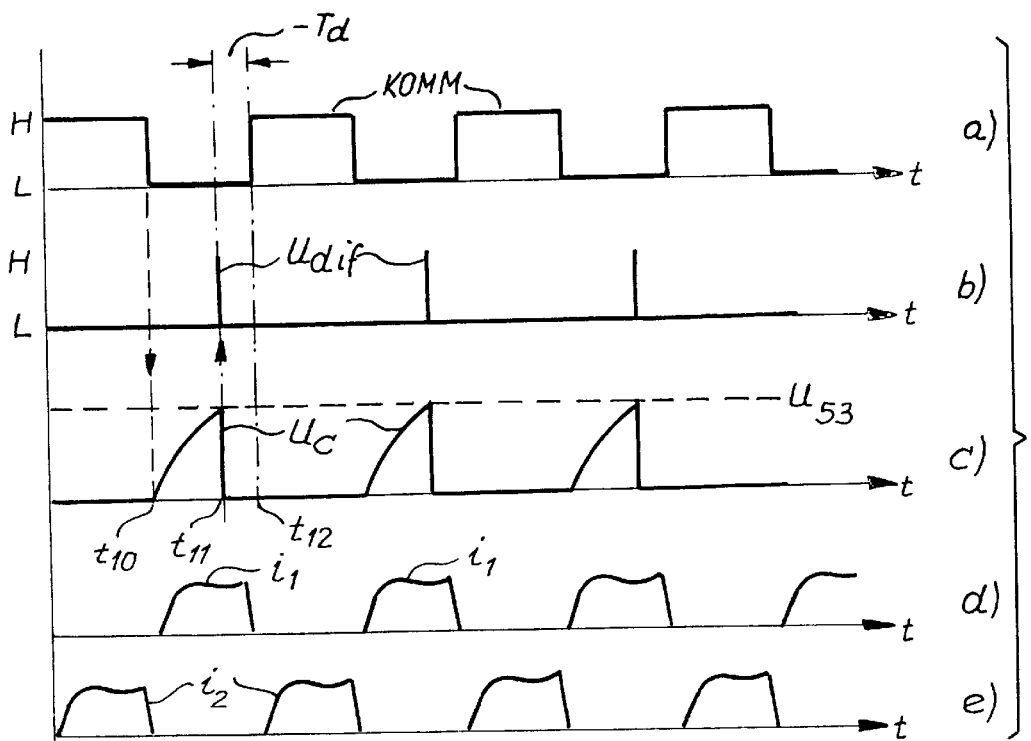
FIG. 6 is a plot of the curves for the case that the motor runs at a rotary speed lower than the desired speed.
Figure 7:
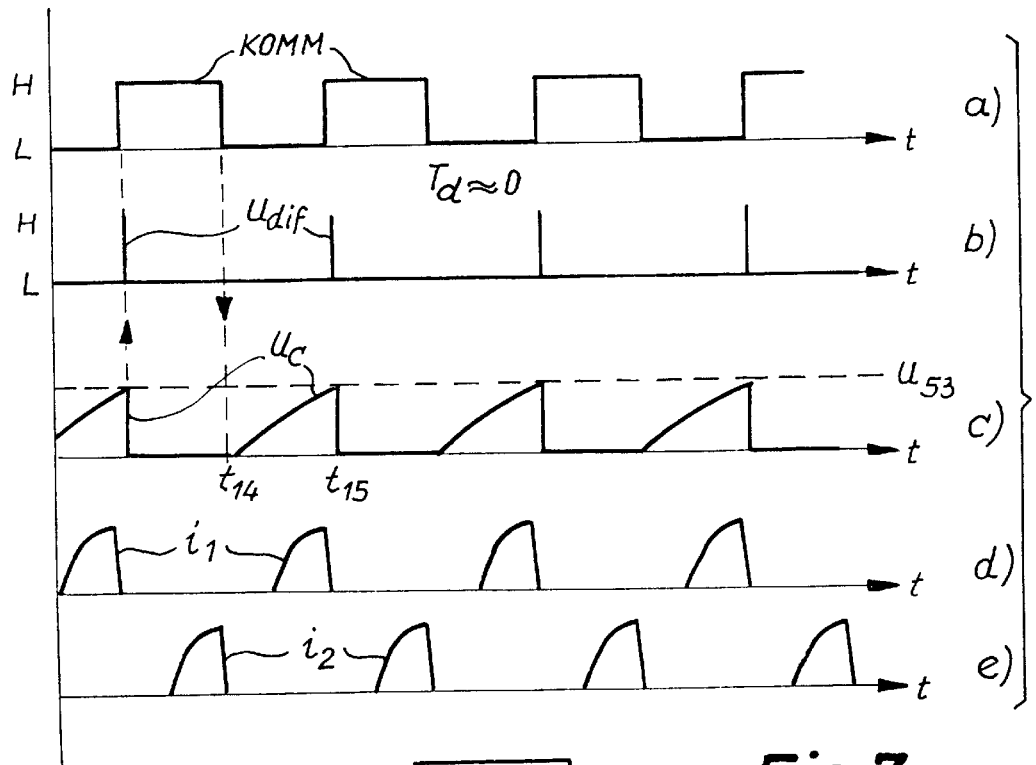
FIG. 7 is a plot analogous to that of FIG. 6, for the case that the motor runs at the "target" RPM or rotary speed.

Preferably, the motor 25 has a permanent magnet rotor 27 that controls a rotor position sensor 28, e.g., a Hall IC. This sensor is shown twice in FIG. 1 for ease of explanation. Its output signal KOMM is supplied to its corresponding input (port) 7 of microprocessor 20. This KOMM signal controls the commutation of currents $i_1$ and $i_2$ in two stator winding strands 31 and 32 of motor 25. As the examples in FIGS. 6 and 7 illustrate, with a low rotor position signal (KOMM= L), only strand 31 can be switched on (current $i_1$), and with a high rotor position signal (KOMM=H), only strand 32 can be switched on (current $i_2$). The duty cycles of currents $i_1$ and $i_2$ depend on the temperature of temperature sensor 26 and on the load of the motor 25, as will be described below.

As shown in FIG. 1, two npn power transistors 33, 34 are used to control the currents $i_1$ and $i_2$. Each of the transistors' bases is connected via a respective resistor 35, 36 to a respective output port 9, 10 of microprocessor 20 (see FIG. 5), with said outputs providing the driver signals out1 and out2 during operation. In addition, a respective capacitor 37, or 38, is connected between collector and base of transistor 33, or 34. The capacitor, together with resistor 35, or 36, serves as a delay circuit when switching off the respective transistor 33, or 34.

Figure 3:
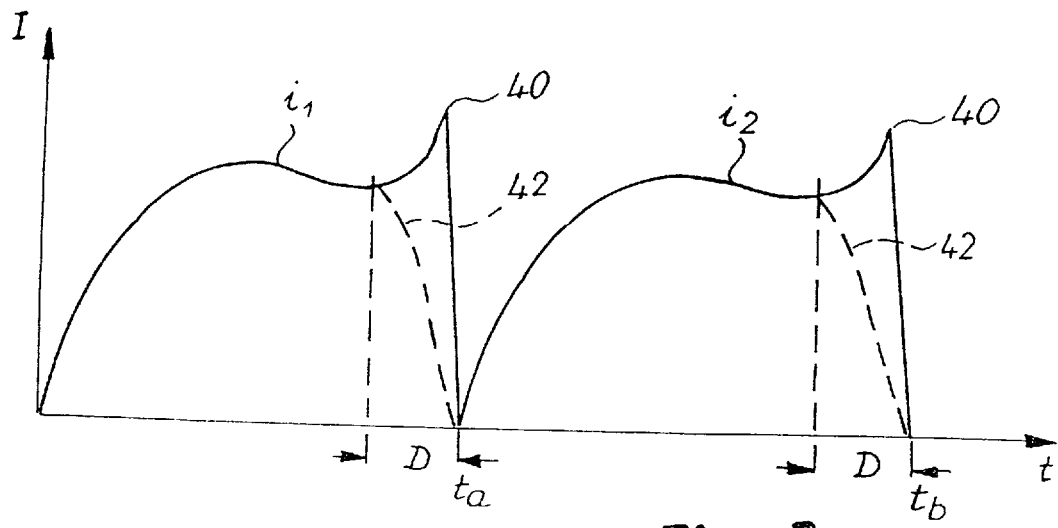
FIG. 3 illustrates the stator currents in a motor according to claim 1 and at maximum RPM, and with the preferred current shutoff at an interval D prior to reaching respective commutation instants ta and tb.

This is illustrated in FIG. 3 showing currents $i_1$ and $i_2$ at full load, that is, at maximum speed.

In FIG. 3, the commutation instants are designated with $t_a$ and $t_b$. If current $i_1$ is shut off just prior to the commutation instant $t_a$, and capacitor 37 is not used, a shutoff current spike 40 is generated and the motor will be noisy.

On the other hand, if current $i_1$ is shut off at a time that is a period D (exaggerated illustration) before the commutation instant $t_a$, and if the RC combination 35, 37 is used, the current characteristic 42, shown by the broken line, is generated, and the motor is significantly more quiet. Due to the symmetry of the circuit, the same is true for the current $i_2$. A preferred embodiment of the invention combines both measures to achieve a quiet run of motor 25.

Distance D can be adjusted in the same manner in relation to the speed by the controller, as described in detail for the value PI (e.g., FIG. 21d) below. For instance, half of the calculated value PI can be used as a delay prior to power-up, and the other half as variable value D, for early cutoff. This optimizes the motor and results in a particularly quiet motor operation; it is thus very well suited for motors with a sine-shaped magnetization of the rotor 27.

Rotor 27 is preferably designed with trapezoidal magnetization and with small gaps between the magnet poles to generate a corresponding trapezoidal counter-electromotive force (c.e.f.). The c.e.f. is also known as "induced voltage." This measure improves efficiency and also leads to a reduction of noise. The currents $i_1$ and $i_2$ shown in FIG. 3 are measured on a motor with such a magnetization. (Such trapezoidal magnetization with small gaps between the poles is sometimes called "square-wave magnetization" in the electric machine industry jargon.)

To illustrate the preferred motor design with two strands (as shown), reference can be made, for instance, to the German patent DE 23 46 380 C2 and U.S. Pat. No. 3,873, 897, Müller/Papst-Motoren, or to motors with a flat air gap according to DE 22 25 442 C3, Müller/Papst-Motoren, published 6 DEC. 1973. These are dual pulse motors as defined in the "asr-digest für angewandte Antriebstechnik" (asr-digest for applied drive technology), 1977, pages 21 to 31. Within the scope of the invention, these motors may also have a single-strand design. In such a case, a bridge circuit is needed to control the single strand; refer to the above mentioned pages of the asr.

In the same manner, the invention can be used for collectorless motors of a different design; for instance, three-strand, triple-pulse motors, to name just one example. However, the illustrated design with a dual-pulse, two-strand motor is particularly simple and advantageous since it requires only a minimum of components.

This is particularly true for fans or similar applications, e.g., as in scanners in laser printers.

An npn-transistor 44 is connected to the alarm output 9 of microprocessor 20. A bell, or an alarm signal lamp, for instance, can be connected to the collector of the transistor to generate an audible or visible alarm signal when the RPM n is too low (FIG. 3). This signal is often processed internally by the user in the respective instrument, for instance.

As FIG. 2 illustrates, within the temperature range Ta (e.g., 20° C.) to Tb (e.g., 50° C.), the speed is to increase with the temperature, that is, a certain temperature value T* is to result in a certain RPM value n*. Thus, the temperature T* has the same function as a nominal or desired value for the RPM n*; the control is therefore a speed control.

To this end, a difference must be formed between this desired or target RPM n*, which is also called the nominal RPM, and the actual RPM. This difference is called the control "deviation". In a digital speed control, the control deviation is usually calculated digitally, which is expensive and time-consuming. The preferred method of calculating the deviation for this invention is analog calculation. This enables control calculations to take place already during the calculation of the deviation and thus speeds up the control process significantly. It also permits the use of a microprocessor with narrow data width since the digital calculation steps do not require counters with a large calculation capacity. This is a significant advantage of the invention.

FIG. 1 shows a circuit with a positive lead 45 and a negative lead 46, with a voltage of, for example, 24V between these two leads, and a motor 25 directly connected to the leads as shown. Using a resistor 48 and a Zener diode 49, a controlled voltage, e.g. 5V, is provided at a lead 50. Via a series resistor 52 and a junction 53, the NTC resistor 26 is connected to this lead and to the ground lead 46. As can be clearly seen, the voltage at junction 53 increases when the temperature decreases, because of the increasing resistance in resistor 26. A microprocessor 20, and the comparator 57 described below, are connected to this controlled voltage as well; this, however, is not illustrated so as not to overburden the drawing.

If the lead to the NTC resistor 26 breaks either at 54 or 55, the effect is the same as when the temperature decreases sharply, that is, the voltage at junction 53 jumps to the value of the voltage of line 50, that is, to a high value.

Junction 53 is connected to the minus input of a comparator 57, whose output 58 is connected to port 6 of microprocessor 20, designated as DIF in FIG. 5. The reason for this designation is that during operation, a voltage $U_{dif}$, which will be explained below, and which is used to easily identify the control deviation (according to the above mentioned definition), occurs at output 58 of comparator 57.

Lead 50 is connected to a capacitor via a charge resistor 62 and a junction 63. Junction 63 is connected to the plus input of comparator 57 and to port 13 of the microprocessor 20. Inside the microprocessor, an npn-transistor 65, which can be controlled with the commands of the microprocessor 20, is connected to this port 13.

MODE OF OPERATION OF FIG. 1 EMBODIMENT

As already explained, transistor 65 discharges capacitor C, whenever this transistor receives a corresponding control command. At such a discharge, port 13 of microprocessor 20—designated with ENTLAD in FIG. 5—assumes a low potential, that is ENTLAD=L. If, on the other hand, the capacitor C is to be charged, port 13 is placed at a high potential, that is, ENTLAD=H. With ENTLAD=L, the capacitor C, serving as a memory device, is set at an initial value, namely a practically discharged condition. This occurs at a predetermined first position of rotor 27, where this position is measured (in the example of this embodiment) using the output signal KOMM of the rotor position sensor 28. There is no need to mention that rotor positions can be measured in a variety of ways, even without a sensor, using the voltages or currents in strands 31, 32 directly. However, using the KOMM signal of a Hall-IC 28 provides a technically simple solution. This is preferred, since it changes abruptly from a high value (H) to a low value (L), or vice versa, in the commutation position range of the rotor.

How often this change-over occurs during one revolution of the rotor depends on the number of rotor poles. For a two-pole rotor 27, as illustrated in the highly schematic representation in FIG. 1, this change-over occurs twice per rotor revolution, and the positions of distinct change-over are 180° separate from one another. These are the commutation positions of the rotor. For a four-pole rotor, there are 4 such positions per revolution, six such positions for a six-pole rotor, etc. In the scope of the invention, a low number of poles offers the advantage that the microprocessor 20 has more time for calculations, or that a slower microprocessor can be used.

Figure 21:
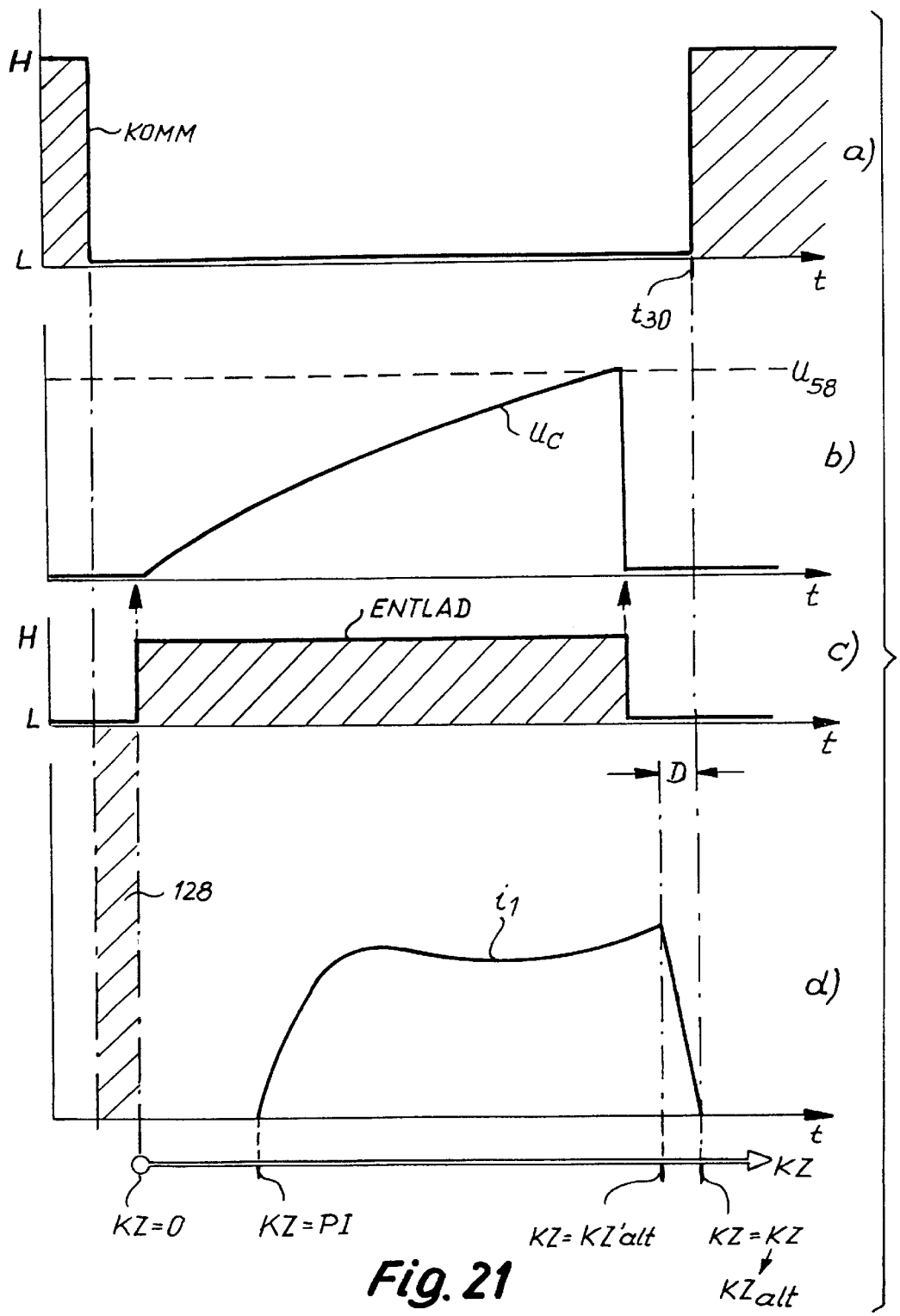
FIG. 21 is a set of graphs, to a common time scale, further explaining operation according to the routines of FIGS. 15–19.

It should be mentioned that, in the embodiment shown, the ENTLAD signal is set to H a short time after commutation only, see FIG. 21. This instant also correlates to a certain rotor position. In the embodiment shown, the design is selected such that charging of capacitor C can be started only after the KOMM signal has made a transition from H to L. FIG. 6 illustrates this in the case where the RPM of the motor is lower than the desired RPM n* (FIG. 2) that corresponds to the current temperature T* at sensor 26, and thus represents the nominal value n* for the motor speed.

With this H to L transition of the KOMM signal, the ENTLAD signal at port 13 is set to H at instant $t_{10}$ of FIG. 6, and the capacitor C is charged via resistor 62, in this case according to an exponential function. (Naturally, a linear charge would be possible also.) This causes the voltage $U_c$ at capacitor C to rise, as illustrated in FIG. 6c; and at instant $t_{11}$, the voltage at junction 63 reaches the same level as the one at junction 53, with the latter corresponding to the current temperature T* at sensor 26, thus representing the nominal value n* of the motor speed. Once the potentials of junctions 53 and 63 are equal, output 58 of comparator 57 is switched from L to H and the voltage $U_{dif}$, illustrated in Graph 6b, is available there.

In a preferred manner, immediately following in this program sequence, the signal $U_{dif}$=H causes ENTLAD to be set to L, see FIG. 21, that is, capacitor C is discharged immediately thereafter causing $U_{dif}$ to appear in the shape of a needle pulse. This immediate discharge causes a very quiet motor run.

The voltage $U_{dif}$ can also remain at H until the next commutation position. In such a case where $U_{dif}$=H, ENTLAD is set to L when KOMM makes a transition from L to H, or from H to L, and the capacitor C is discharged via transistor 65 (inside microprocessor 20). In this case, this would take place at instant $t_{12}$ of FIG. 6. The following description relates to the preferred version with the discharge of capacitor C immediately following the occurrence of the signal $U_{dif}$. In this version, this signal is stored temporarily in the form of a signal $U_{difalt}$=H (see the following flow diagrams) so as not to lose the information of the $U_{dif}$ signal after discharge of capacitor C.

The measurement of the control deviation is carried out in the following way:

From the commutation position $t_{10}$, where charging of the capacitor was started, one moves to the next commutation position $t_{12}$ and measures the time difference $T_d$ from this (next) commutation position $t_{12}$ (or another position close by), to the beginning of $U_{dif}$, that is to the instant $t_{11}$. If the RPM is too low, $t_{11}$ is ahead of time of $t_{12}$ and $T_d$ is measured with a negative sign. A negative $T_d$ indicates that the RPM is too low and the quantity of $T_d$ (absolute value) indicates how much the RPM is too low. Currents $i_1$ (FIG. 6d) and $i_2$ (FIG. 6e) through the winding strands 31, or 32 are, in this case, increased in order to increase the RPM.

FIG. 12 shows how, in principle, this occurs. Graph 12a illustrates the KOMM signal, in this case for approximately one rotor revolution of 360° for a two-pole motor 27. Graph 12b illustrates the signal $U_{dif}$, as described previously, when the RPM is too low, i.e., the control deviation is $-T_d$. As described in FIG. 12 at 70, a quantity PI (meaning Proportional Integral control) is calculated during the first degrees of the total rotation. The calculations are based on a numeric value P for proportional control and of a numeric value I for integral control, using, for instance, the equation PI=I+2P, where I and P are available from previous revolutions of the motor and are stored in corresponding memories. (When switching the motor on, certain I and P values are preset during initialization.)

This PI value then specifies, as illustrated, how many degrees it is, after the end of the calculation phase, that the current $i_1$ (through strand 31) is switched on, as shown in FIG. 12 at 72. If PI increases, this current decreases. The current flow begins at instant $t_1$. This time-dependent control is accomplished by setting the output signal, out1, at output 9 of the microprocessor 20 to H, when the current $i_1$ is to be switched on.

This current then flows, for example, during a 110° rotational angle, and is shut off before reaching the commutation position, which corresponds to an angle of 180° in this example. Shut-off takes place at an angle D before the commutation position, with the value of D being a few degrees. The purpose of this is to avoid shutoff current spikes.

Starting with signal $U_{dif}$, a time measurement for the control deviation $-T_d$ starts, and the measurement lasts to the commutation position, that is to 180°.

Figure 17:
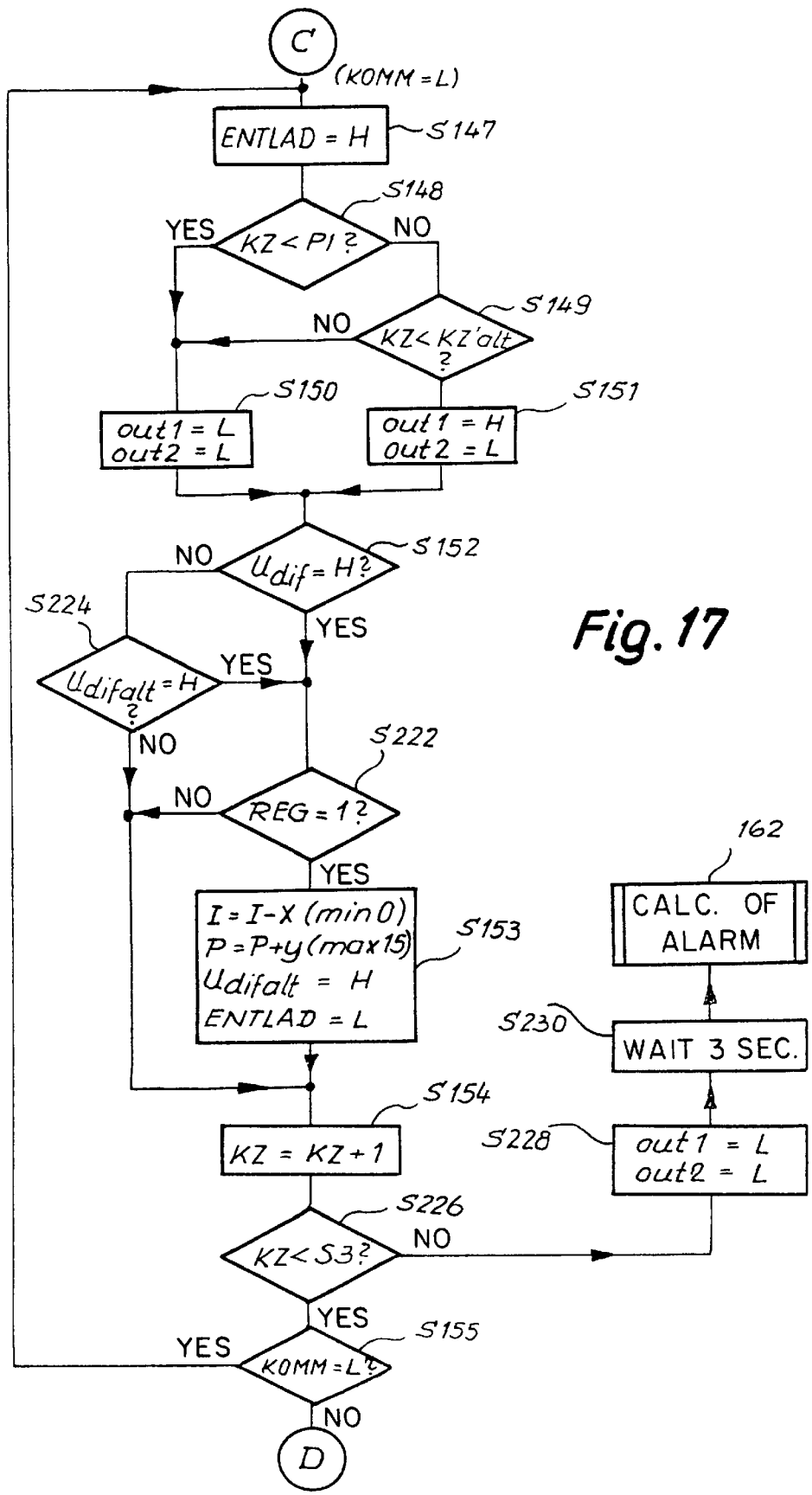
FIG. 17 shows a routine for implementation of FIG. 12.

Since the motor is running too slow, already during this period $T_d$, the values for P and I are being lowered. The longer the period $T_d$ is, the more these values are lowered. This is described in FIG. 12 at 74. (If the controller were a P controller only, only the quantity P would be altered.) Referring to FIG. 17, a detailed description of this procedure follows.

At the end of the $T_d$ measurement, the rotary position of 180°, the P and I values are already updated and smaller than the previous values. From these updated values, a new PI* value is being calculated in the rotational angle area of, for instance 180° to 190°, as described in FIG. 12 at 76. A detailed description of this calculation with reference to FIG. 19 follows below. This PI* value then determines the switch-on point $t_2$ for the current $i_2$ in strand 32, as indicated at 78, and this current flows longer, for instance for 120 degrees, than current $i_1$. Current $i_2$ also ends at a value that is D degrees before the next commutation position, which is at 360°. Since the current $i_2$ flows during a longer rotational angle, a longer lasting driving torque to the rotor 27 is generated, and the motor runs faster, that is, the RPM n nears the value n*.

In the angle range of, for instance 360° to 370° (corresponding to 0° to 10°) the value PI could again be calculated from the stored values of P and I that haven't changed. However, in an advantageous refinement of the invention, an alarm monitoring can be incorporated at this position, that is, a special calculation program determines if the speed n is below the lower limit, and generates an alarm if this is the case. This is described in FIG. 12 at 80, and in greater detail below with reference to FIG. 20.

Thereafter, the PI* value calculated at 76 is used to determine the instant $t_3$ for switching on the current $i_1$. This is described in FIG. 12 at 82.

The procedures are then repeated, i.e., a new signal $U_{dif}$ is generated, which will occur somewhat later since the speed has increased making the absolute value of $-T_d$ shorter; the P and I values will change, that is, they decrease further, and a new PI value is calculated. The rest of the procedure follows as detailed above.

In this manner, the various sections of a rotor revolution are assigned to various calculation steps, i.e., the position of the rotor 27 determines what the microprocessor 20 calculates or measures at that given time. In other words, the rotor position controls the program sequence at a given time.

FIG. 7 illustrates what happens when motor 25 runs at a desired RPM, i.e., the motor RPM is the same as the desired or targeted RPM n*.

Here too, charging of capacitor C starts after the KOMM signal transition from H to L, as is the case in FIG. 7c at instant $t_{14}$. The voltage $U_C$ increases to the voltage $U_{53}$ at junction 53 shortly after instant $t_{15}$, where the L to H transition of KOMM takes place. Starting with this instant $t_{15}$, the time $T_d$ is being measured, and since the rising edge of $U_{dif}$ is practically at the same location as $t_{15}$, $T_d=0$, i.e., there is no control deviation.

In this case, the P and I values are correct and will not be changed, i.e., the PI distance, as described in FIG. 12 at 72, remains unchanged for the subsequent current pulses.

During operation, the P and I values change only slightly when the motor 25 is running and the temperature does not change at sensor 26; this is the most common motor condition. Depending on the temperature, relatively short motor current pulses $i_1$ and $i_2$ are generated, as illustrated in FIGS. 7d and 7e.

Figure 8:
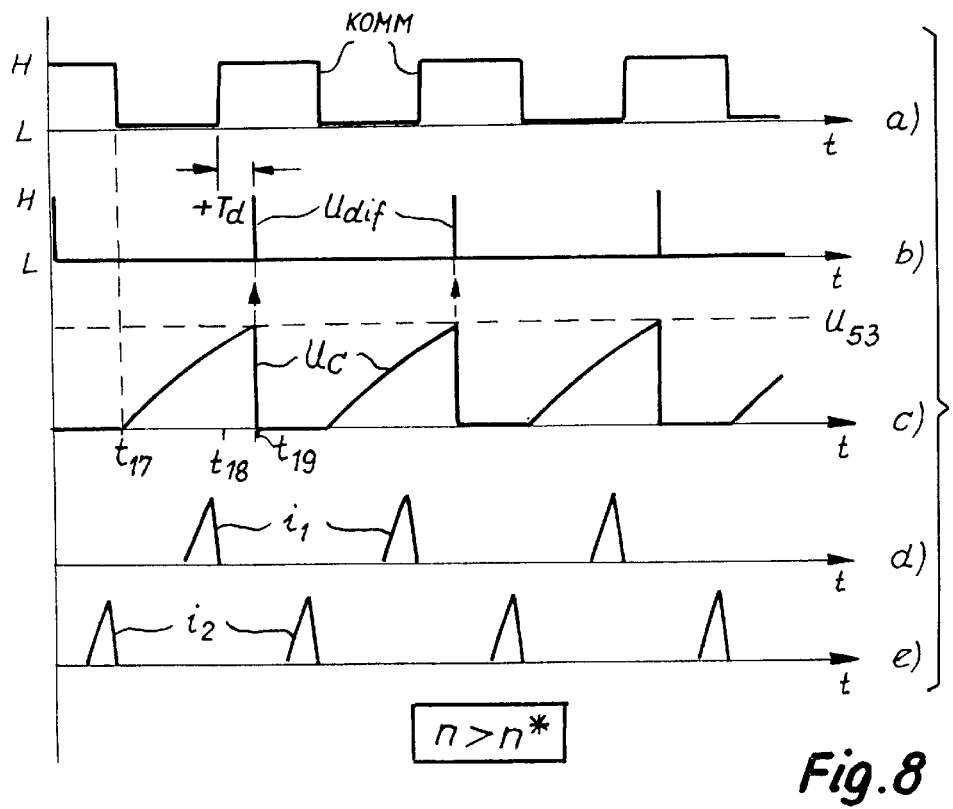
FIG. 8 is a plot analogous to that of FIGS. 6 and 7, for the case that the motor runs too fast.

FIG. 8 illustrates what happens when the RPM n is higher than the desired RPM n*. This may occur, for instance, when cold air is sucked in suddenly (a window is being opened in winter) and the resistance of sensor 26 increases rapidly.

Here too, charging of capacitor C starts at instant $t_{17}$, the KOMM signal transition from H to L, and the measurement of $T_d$ starts approx. at instant $t_{18}$, immediately after which there is a KOMM signal transition from L to H.

Here, the signal $U_{dif}$ does not occur until the instant $t_{19}$, which is after $t_{18}$, where $T_d$ is therefore positive. The positive sign indicates that the motor is running too fast, and the absolute value of $T_d$ suggests by how much the motor is too fast. Accordingly, the motor currents $i_1$ and $i_2$ must be made shorter. This is illustrated in FIG. 13.

Figure 13:
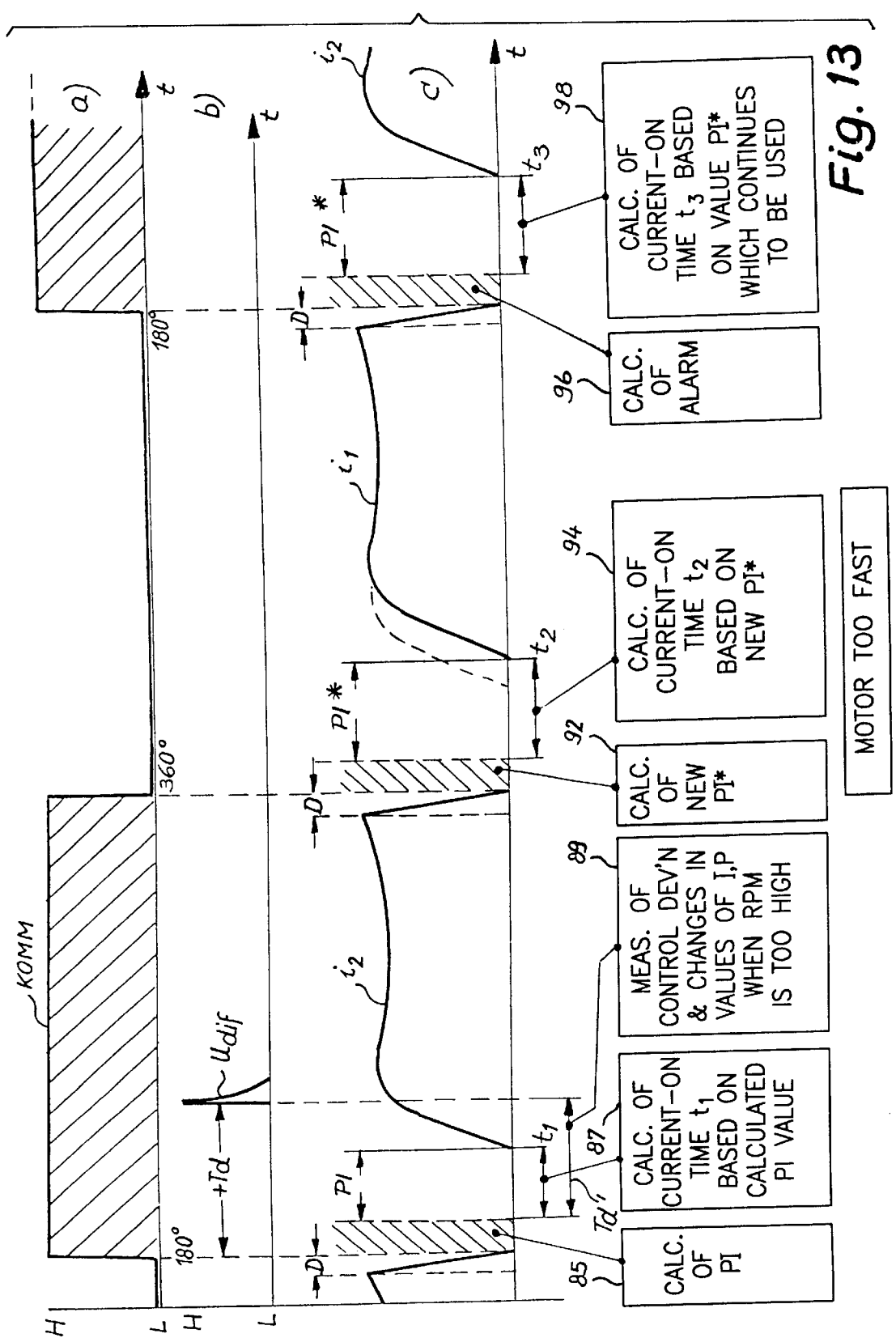
FIG. 13 is a plot, analogous to FIG. 12, for the case that the RPM is too high.

Similar to FIG. 12, FIG. 13 shows the sequences of an entire rotor revolution of 360°, as illustrated in Graph 13a. The angle position starts at the left, at 180°. In the center, it reaches 360°=0°, and at the right, again 180°, meaning the revolution is concluded.

In FIG. 12, the RPM was too low, and therefore, $T_d$ had to be measured during the period from 0° to 180°, where KOMM=L. In FIG. 13, the RPM is too high, and therefore, $T_d$ has to be measured during the period from 180° to 360°, where KOMM=H.

Figure 19:
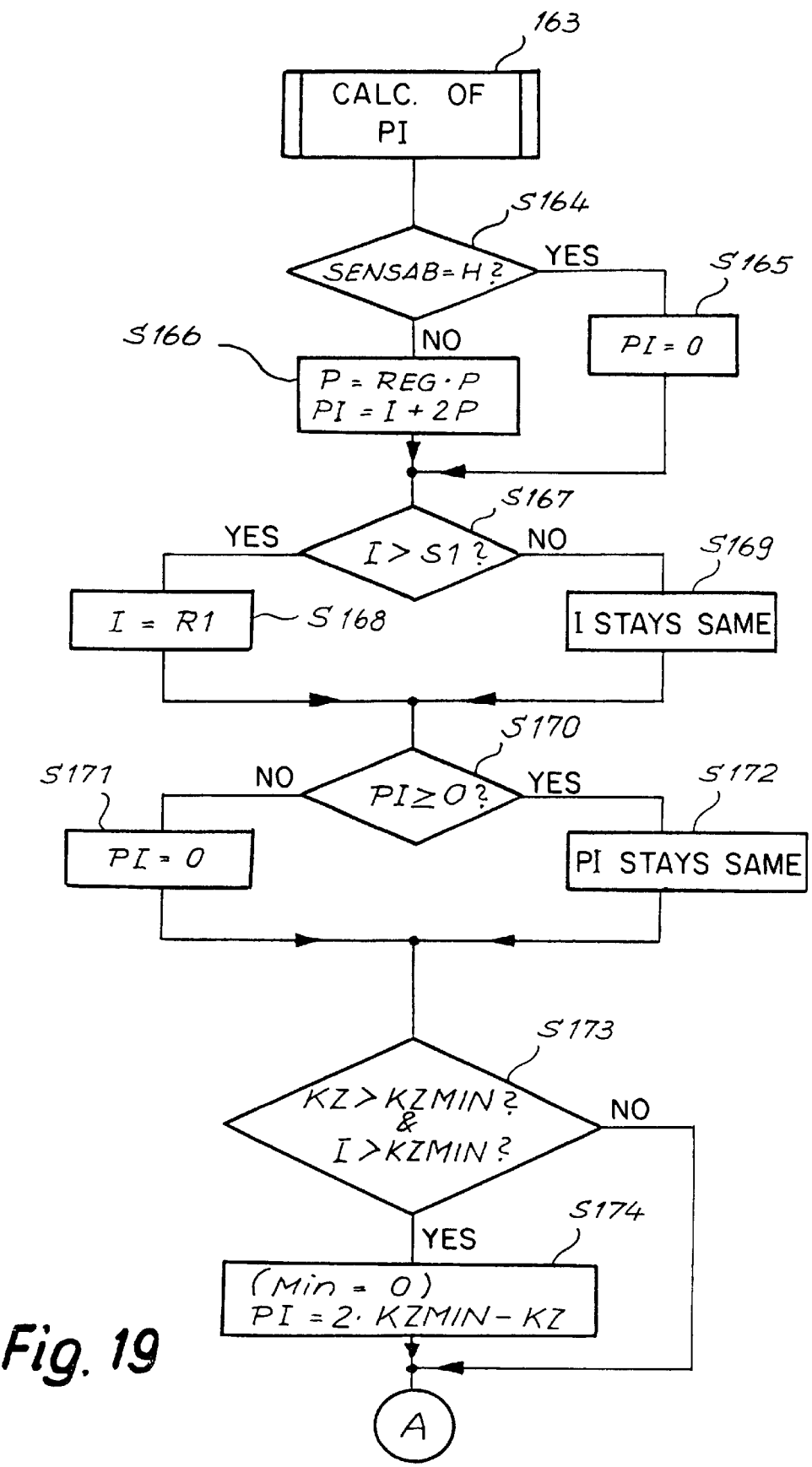
FIG. 19 shows a routine for calculation of a quantity PI for RPM regulation, or for the control of the RPM.

In FIG. 13, initially, at an angle range directly following 180°, during a rotation of, e.g., 10°, the PI value is also calculated from the available P and I values, as was described for FIG. 12. In FIG. 13, this is described at 85 and the routine is illustrated in FIG. 19.

This PI value is used to determine the instant $t_1$ for switching on the current $i_2$, as described in FIG. 13 at 87.

At the same time that $t_1$ is being calculated, a value $T_d'$ is being measured, which is shorter than $T_d$, since the measurement does not start until after the calculation phase 85 is concluded, as is clearly seen in FIG. 13. This may be compensated for in a program, since the period of the calculation phase 85 is known, but the circuit also functions very satisfactorily, when the value $T_d'$ is being measured.

Figure 16:
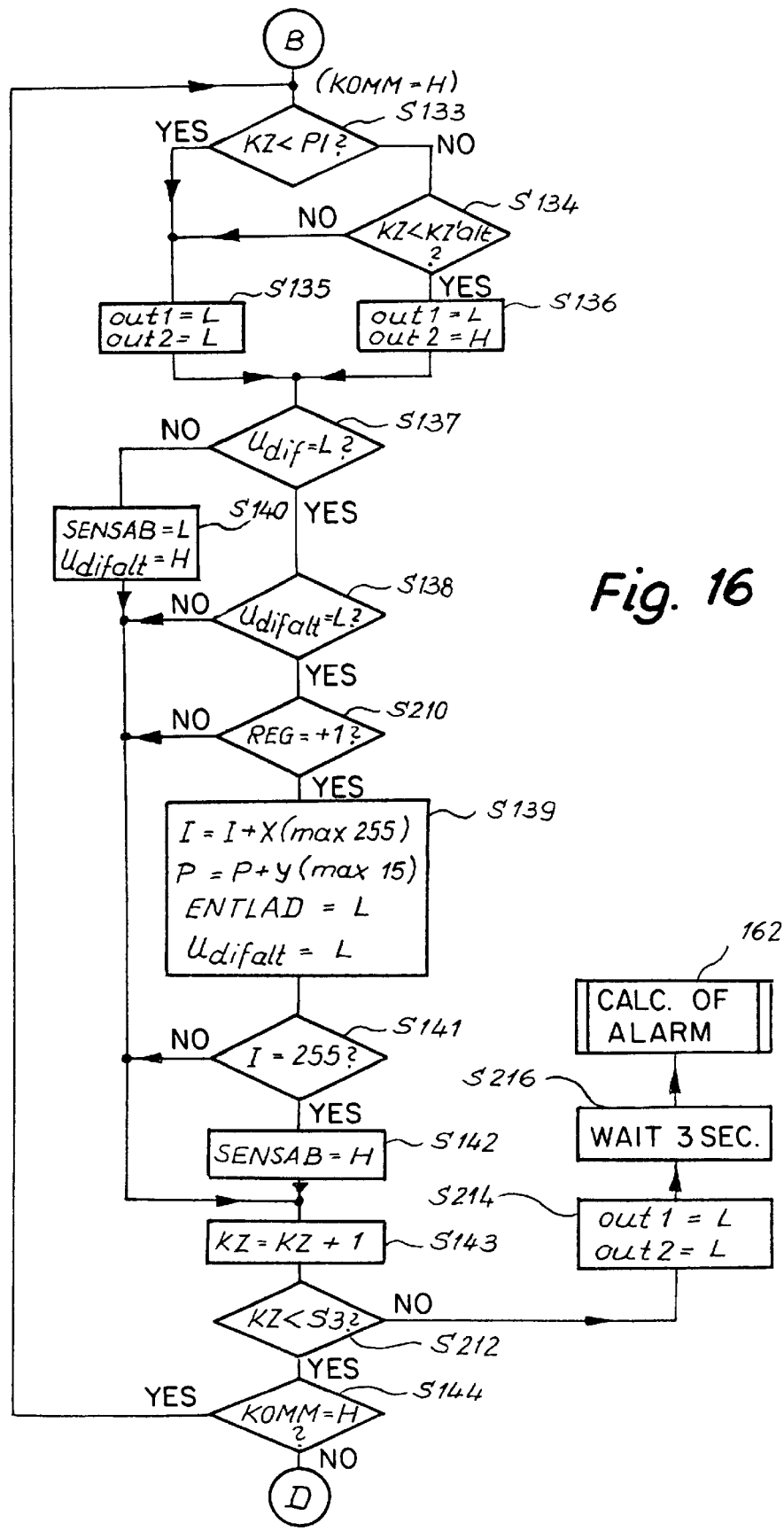
FIG. 16 shows a routine for implementation of FIG. 13.

Since the motor is running too fast, the values for P and I are too low, and therefore raised during the period $T_d'$. The longer the period $T_d'$ is, the more these values will be raised. Already at the end of $T_d'$, updated, raised values for P and I are available, which are suitable to lower the RPM accordingly. This is described in FIG. 13 at 89 and the routine is shown in FIG. 16.

It should be mentioned here that in FIG. 12, there is a time difference between the measurement of a negative $T_d$ (step 74) and the calculation of the instant $t_1$ (step 72), while in FIG. 13 steps 87 and 89 must occur parallel. Thus, different control algorithms are needed here. Since by definition, charging of capacitor C starts at the H to L transition of the KOMM signal, that is, in FIGS. 12 and 13 at the commutation position 360°=0°, the algorithm for "RPM too low" runs preferably in the rotational angle range where KOMM=L, and the algorithm for "RPM too high" in the rotational angle range where KOMM=H, as illustrated in FIGS. 12 and 13.

If the charge cycle for capacitor C were to start at the L to H transition, that is at the commutation position of 180°, the algorithm for "RPM too low" would have to run when KOMM=H, and the algorithm for "RPM too high" would have to run when KOMM=L. This also results from the symmetry of an electro-motor. These alternative embodiments, not shown, can have advantages in many cases.

In the same manner, $T_d$ can also be measured at another point of the rotor revolution, i.e., it does not matter to the measurement of $T_d$ and its sign, if, for example, the hall generator 28 is at a different point of the motor in relation to the rotor 27. The most important point is that, at defined locations of the rotor rotation, suitable signals are available to control charging of capacitor C (that is, to start the charge cycle and to discharge) and to take the $T_d$ measurement. Naturally, currents $i_1$ and $i_2$ may only flow in a certain range of the rotational angle, namely in those areas of the rotational angle where the already-mentioned counter-EMF is at a high level; and, if the Hall IC 28 is adjusted such that these currents flow in the correct area of the rotational angle, the KOMM output signal is capable of fulfilling both functions, namely a) control the commutation, and b) enable measurement of the control deviation.

Regarding FIG. 13: In the area directly after 360°=0°, that is, for instance, from 0° to 10°, a new PI* is calculated from the updated values of P and I. This new PI* is greater than the previous PI, and this is described in FIG. 13 at 92. The routine shown in FIG. 19 is used for this purpose.

Thereafter, the instant $t_2$, the current switch-on point, is being calculated using the new PI* value. While, for instance, current $i_2$ was flowing during a rotational angle of 130°, $i_1$ will flow only during a rotational angle of 120°. (Of course, the difference is much smaller in practical applications, but using larger differences enables clearer graphical illustrations.)

Figure 15:
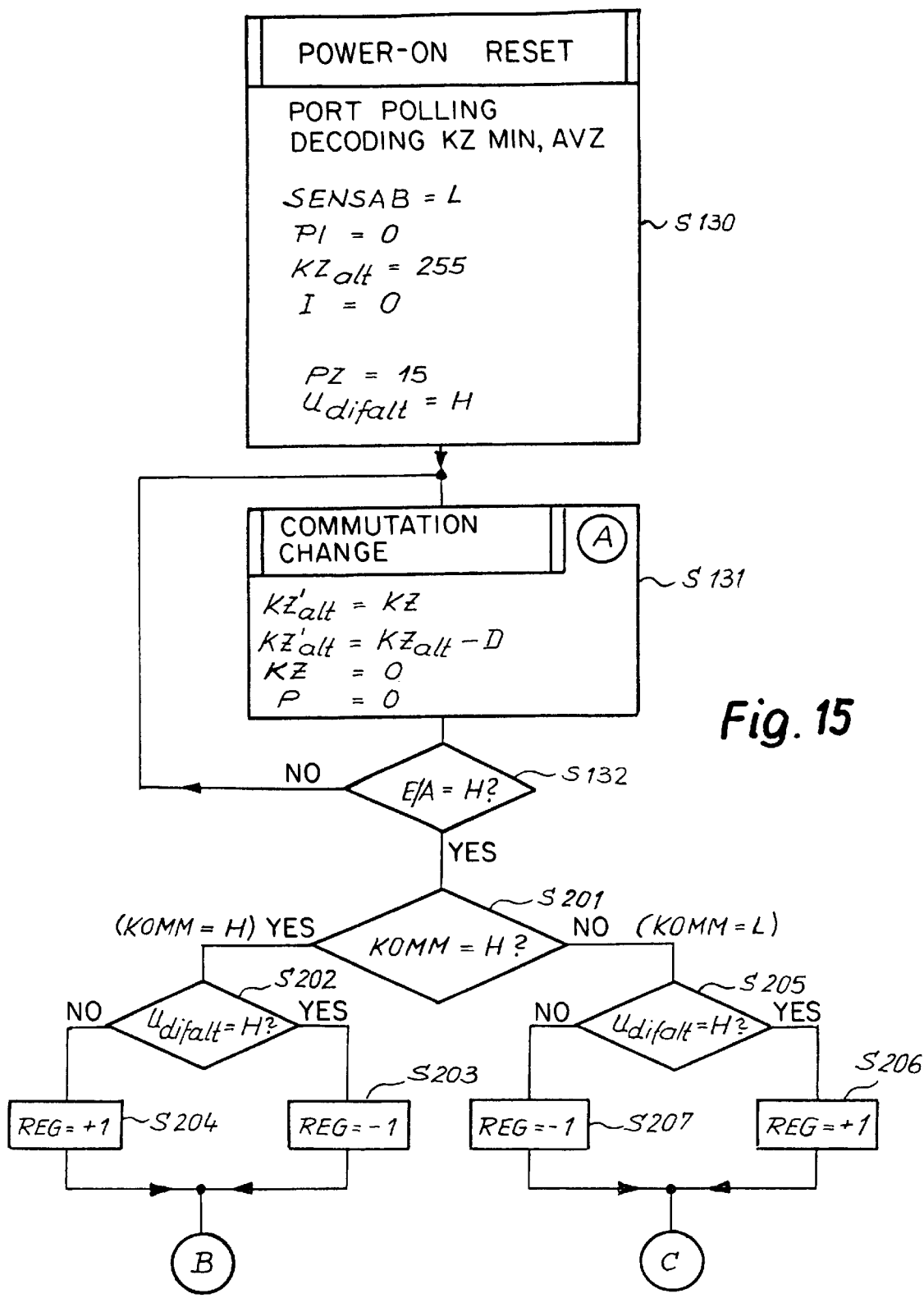
FIG. 15 is a flowchart of routines executed upon initialization of the microprocessor.

As has already been explained, both currents, $i_2$ and $i_1$, are switched off at a distance D prior to the commutation position (360° or 180°), which is taken into consideration at program step S131 (FIG. 15).

After the commutation position of 180° (on the right side in FIG. 13), a calculation can be carried out at 96 to determine whether an alarm should be generated, or a new PI value can be calculated. As described in FIG. 13 at 98, the PI value remains unchanged, since there is no new measurement value for $T_d$.

It is, therefore, important that the $T_d$ measurement occurs parallel to updating the P and I values, and if applicable, also parallel to the calculation of the switch-on point for the current, and that, where applicable, thereafter a measurement is used for several current pulses until a new measurement is taken. After all, significant changes in the rotor RPM do not occur in the course of one or two rotor revolutions.

Figure 9:
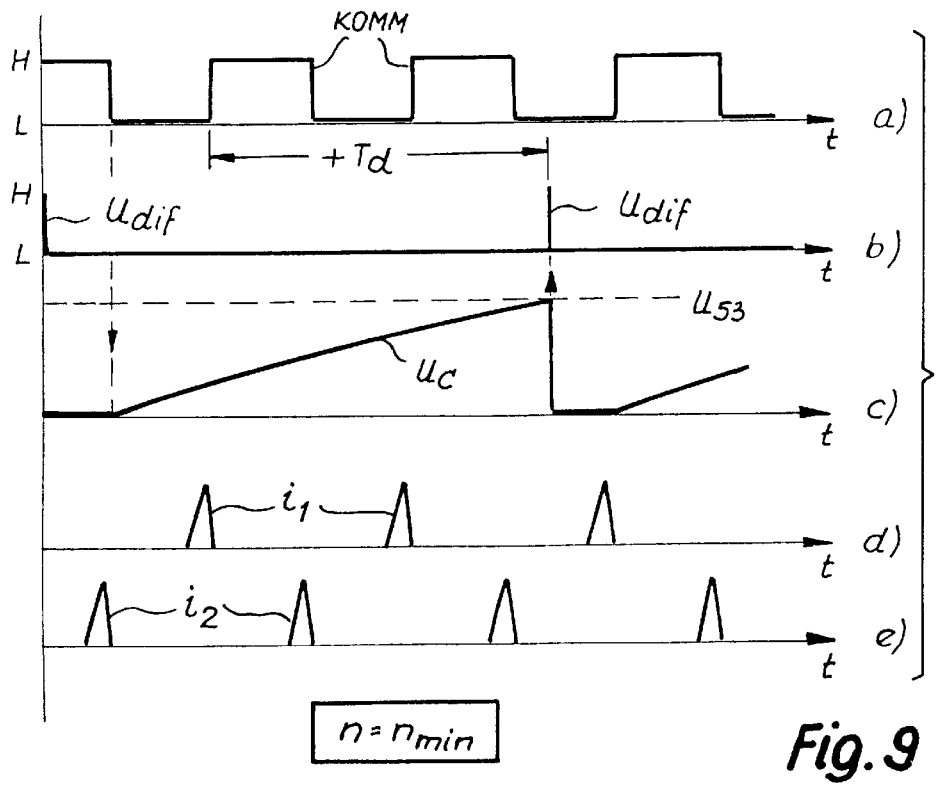
FIG. 9 is a plot analogous to that of FIGS. 6–8, for the case that the motor runs at the minimum permissible rotary speed.

FIG. 9 illustrates what happens when the temperature is very low. In this case, the voltage $U_{53}$ is very high, and voltage $U_c$ will reach this potential only after a few motor rotations, i.e., $T_d$ has a positive value and is very high. This would correspond to a very low motor speed n, which is not acceptable. In such a case, the motor switches to proportional control and retains a low speed of, e.g., 1400 RPM. Current pulses $i_1$ and $i_2$ are very short in such instances.

Figure 10:
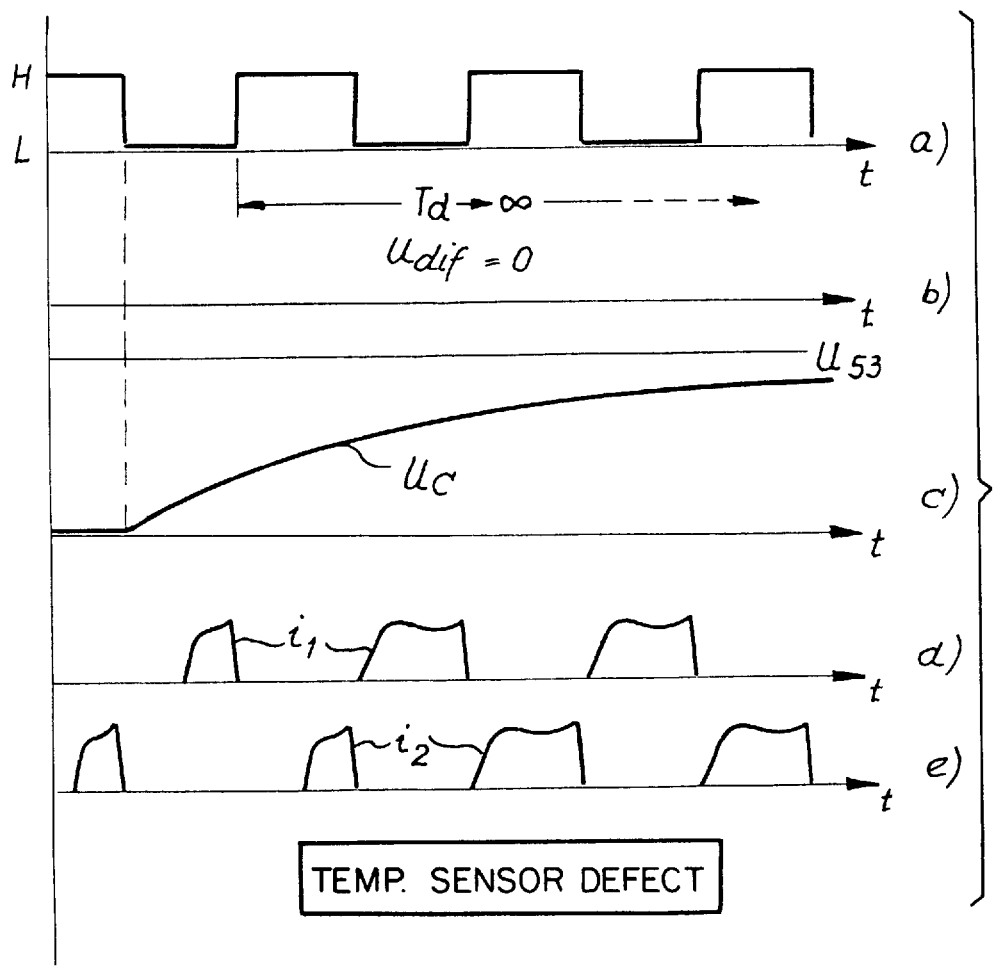
FIG. 10 is a plot analogous to that of FIGS. 6–9, for the case that the temperature sensor is defective, or its connecting line is broken.

FIG. 10 illustrates what happens when the temperature sensor is defective, perhaps because of a break at points 54 and 55. In such a case, the voltage $U_{53}$ goes so high that the voltage $U_c$ can never reach this potential. In such a case, the circuit switches to maximum RPM, as shown symbolically in Graphs 10d and 10e, in other words, the stator current pulses $i_1$, $i_2$, acquire the maximum possible length.

Figure 11:
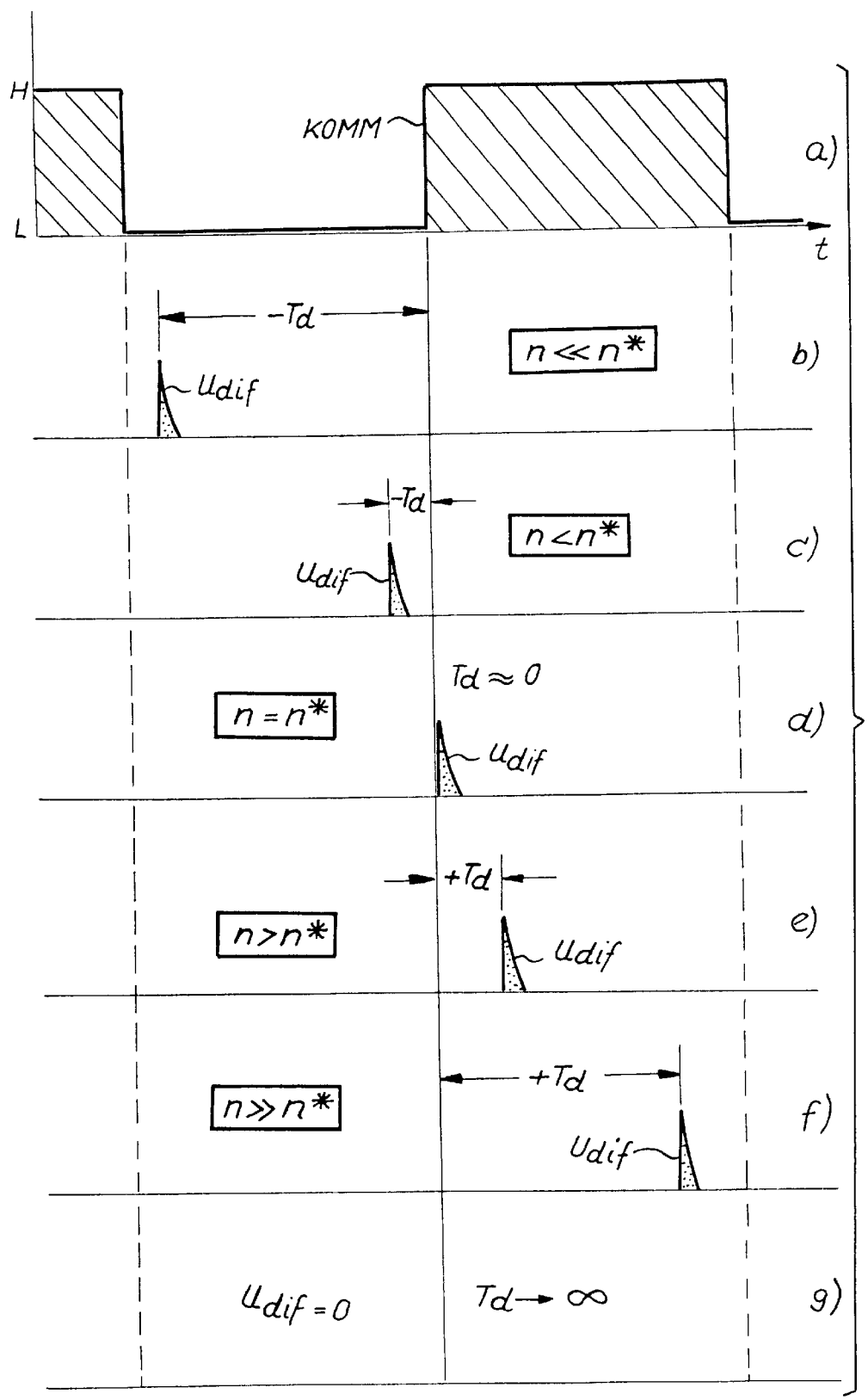
FIG. 11 is a synoptic representation of signals $U_{dif}$ for various cases, with the instantaneous RPM and the target RPM in each case represented by n and by n*, respectively.

FIG. 11 once more illustrates synoptically the different possibilities:

In Graph 11b, the motor is significantly too slow, thus $T_d$ has a negative sign and has a great absolute value.

In Graph 11c, the motor is too slow, but not significantly. $T_d$ is negative, but its absolute value is smaller when compared to the one in Graph 11b.

In Graph 11d, the motor runs at the correct RPM n=n*. The voltage $U_{dif}$ is in the area of the signal KOMM=H. The value of $T_d$ is 0.

Graph 11e illustrates the situation when the motor runs too fast, but not significantly too fast. $T_d$ is positive but has a small absolute value.

In Graph 11f, the motor is significantly too fast; $T_d$ is positive and has a high absolute value.

In Graph 11g, the sensor is defective. $T_d$ has an extremely high value, or an infinite value, where $U_{dif}$ remains at 0. An evaluation of this condition by microprocessor 20 causes motor 25 to switch to maximum RPM.

Figure 4:
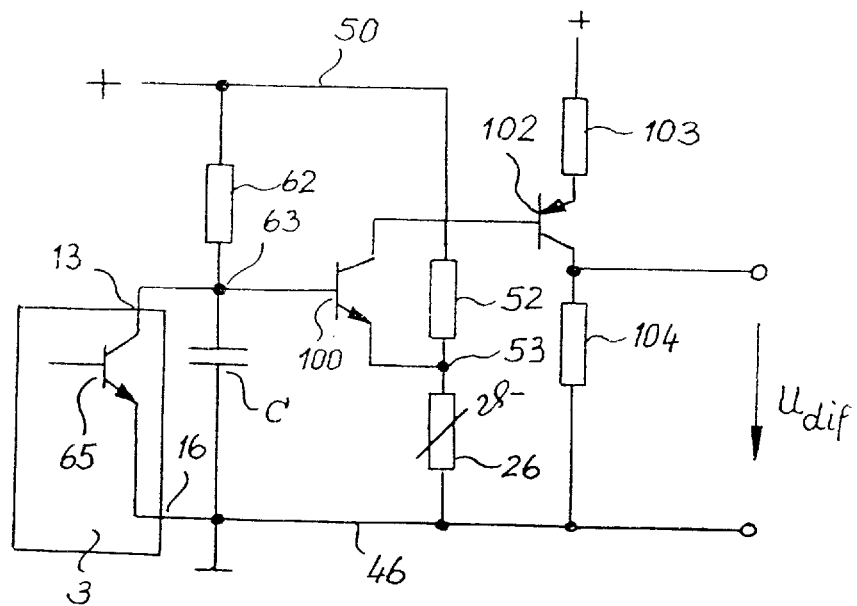
FIG. 4 depicts a variation of a detail of FIG. 1.

In practical applications, this comparator circuit (FIG. 1) can be implemented using an npn-transistor 100 and a pnp-transistor 102, as illustrated in FIG. 4. If parts that appear in FIG. 1 also appear in FIG. 4, the same designation is used and they are not described again.

The base of transistor 100 is connected to junction 63, its emitter is connected to junction 53, and its collector is connected to the base of transistor 102. The emitter of transistor 102 is connected via a resistor 103 to a positive voltage, and its collector is connected via a resistor 104 to ground 46. During operation, at resistor 104 one can pick up the voltage $U_{dif}$.

Figure 14:
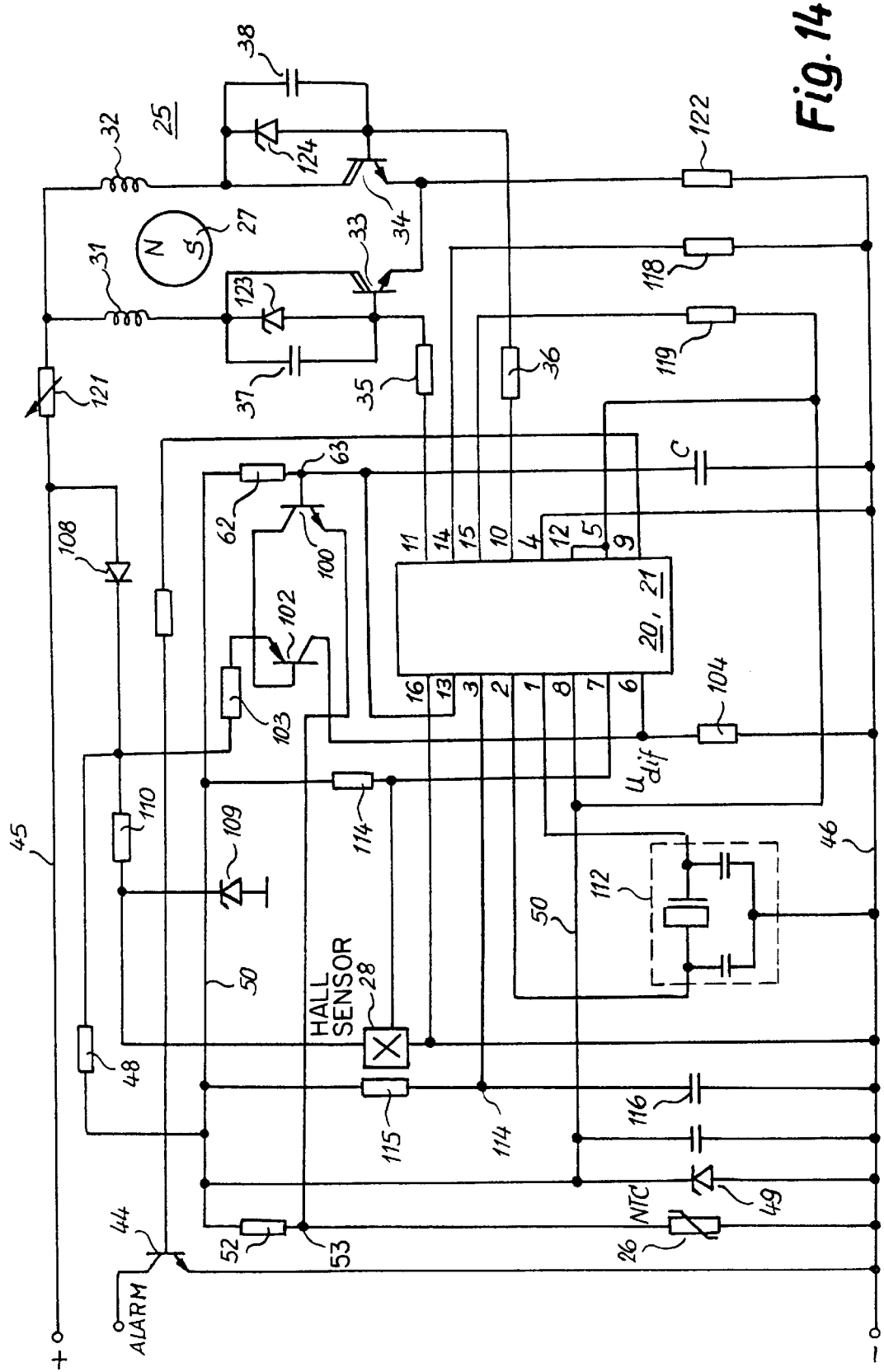
FIG. 14 is a circuit diagram of a preferred embodiment with various advantageous details or components.

FIG. 14 shows a circuit with further details. For the comparator, it uses the circuit of FIG. 4, but is otherwise like that of FIG. 1. For this reason, the same reference numerals are used for the same elements, and are generally not described again.

The line from the positive lead 45 (e.g., a 24 or 48 V operating voltage) to the electronic components includes a diode 108, which blocks if the connections are wrong (wrong polarity), thereby preventing damage to the electronic components. A Zener diode 109 and a series resistor 110 are provided for the power supply of the Hall IC 28.

A clock generator 112 of, for example 6 MHz, is connected to terminals 1 and 2 of microprocessor 20. A resistor 114 is located between port 7 and lead 50. This is the so-called pull-up resistor of Hall IC 28.

The reset terminal (port 3) of microprocessor 20 is connected to junction 114. This junction, in turn, is connected to the positive lead 50 via resistor 115, and to the negative lead 46 via capacitor 116.

During power-up of the motor, capacitor 116 is not charged, and junction 114 is initially at Zero potential, or signal L. This signal L causes the start-up initialization of microprocessor 20, as will be described in step S130 below. Thereafter, capacitor 116 will start charging and the signal at port 3 goes to H, which ends the initialization procedure.

The voltages at ports 14 and 15 determine the minimum RPM of the motor, which is the value $n_{min}$ in FIG. 2. This is achieved through resistors 118, 119 and the connections to the positive (50) and the negative (46) leads respectively shown in the diagram. Port 4 is connected to the negative lead 46. The potential at port 12 (H or L) determines the duration of the alarm delay AVZ (0 or 10 seconds). Ports 5 and 12 are connected to lead 50 (+) in the exemplary embodiment. The on/off-port E/A enables digital control of motor 25: if it is at L, the motor is stopped; if it is at H, (as in FIG. 14), the motor runs. In this manner, the motor can be switched on using a low voltage signal. On the plus side, a PTC (Positive Temperature Coefficient) resistor 121 is in line with motor 25 serving as a fuse when the motor blocks; on the negative side, there is a low-resistance resistor 122, which enhances the switching procedures. To protect the microprocessor 20 from surges stemming from motor windings 31, 32, a Zener diode 123 is placed parallel to capacitor 37 and a Zener diode 124 parallel to capacitor 38.

The mode of operation has already been described with reference to FIGS. 1 and 4. Power-up initialization using resistor 115 and capacitor 116 has also been described. Regarding the microprocessor, please see FIG. 5, indicating the symbolic designations used for the individual ports.

Following are detailed descriptions of the flowcharts for the procedures illustrated in FIGS. 15 to 20, which represent the "best mode" known at the moment. (Programs are subject to frequent changes and improvements, as those skilled in the art know.)

FIG. 15 shows the power-up procedures of the motor at step S130, the Power-ON reset which upon power-up is carried out by resistor 115 and capacitor 116, as described with regard to FIG. 14. The various ports of microprocessor 20 are polled or scanned. In FIG. 5 these are port ATS (whether H or L) indicating the alarm RPM (e.g., 1200 RPM), port SEN, indicating whether an alarm signal can be reset (when the speed returns to normal) or whether it should be stored. In addition, ports NG0 and NG1 are being polled; together they specify the minimum RPM $n_{min}$, e.g., 1400 RPM; and the already mentioned on/off-value E/A is being checked, which indicates whether the motor is to run or stand still. Thereafter, the NG0 and NG1 values are decoded and result in a value KZMIN for the minimum RPM, e.g., 120 units. (The higher this value is, the lower the RPM will be.)

In addition, the following registers will be set:
SENSAB to L.
PI to a low value, e.g., to 0.
KZalt to a high value, e.g., to 255.
I to a low value, e.g., to 0.
PZ to the maximum value, here to 15.
$U_{difalt}$ to H.
SENSAB=L means that there is no interrupted sensor connection, in other words, there is no break in the lines to sensor 26 at points 54 or 55. SENSAB=H means maximum RPM and disables the control, i.e., PI is set to Zero; (comp. to FIG. 19 step S165).

PI is the control quantity of the controller. As FIG. 21d shows, it determines the switch-on time for the motor current: Only when the commutation counter KZ reaches the PI count, that is, the control quantity, will the current $i_1$ (or $i_2$) be switched on. If PI is a large number, the current will be switched on later and the power will be lower. If PI is small, the current will be switched on sooner and the power will be greater.

KZalt is a count quantity for the commutation counter KZ. (The commutation counter KZ is part of microprocessor 20—FIG. 5—and is therefore not shown separately.) As can be seen in FIG. 21d, the commutation counter begins to count shortly after a commutation, when the calculation phase 128 is concluded (for an explanation see FIG. 12 at 70 or 80). Once the commutation counter has counted to PI, it will switch the respective strand on, and the motor current begins to flow. When the commutation counter reaches the quantity KZ'alt, which is smaller than KZalt by a value of D (e.g., by 4 units), the counter will switch the current off again.

Then the commutation counter continues to count to the next commutation, measuring the quantity KZ, that is the time period from KZ=0 (end of the calculation phase 128) to the next commutation ($t_{30}$ in FIG. 21a). If this value is too high, it serves as an indicator for a blocked rotor, as explained below. This quantity KZ is then stored in the KZalt register as KZalt value, that is, as the most likely value for the duration of the next commutation phase. It may also be advantageous to use the moving average of several just-measured KZ values, because this will make the running of the motor even more quiet. This variation is not shown in the flowchart, but its implementation would represent no problem for one skilled in the art.

KZalt is preset for step S130, since no value has been measured yet.

I is the integral factor of the speed controller, whose value must be preset at the start.

Figure 18:
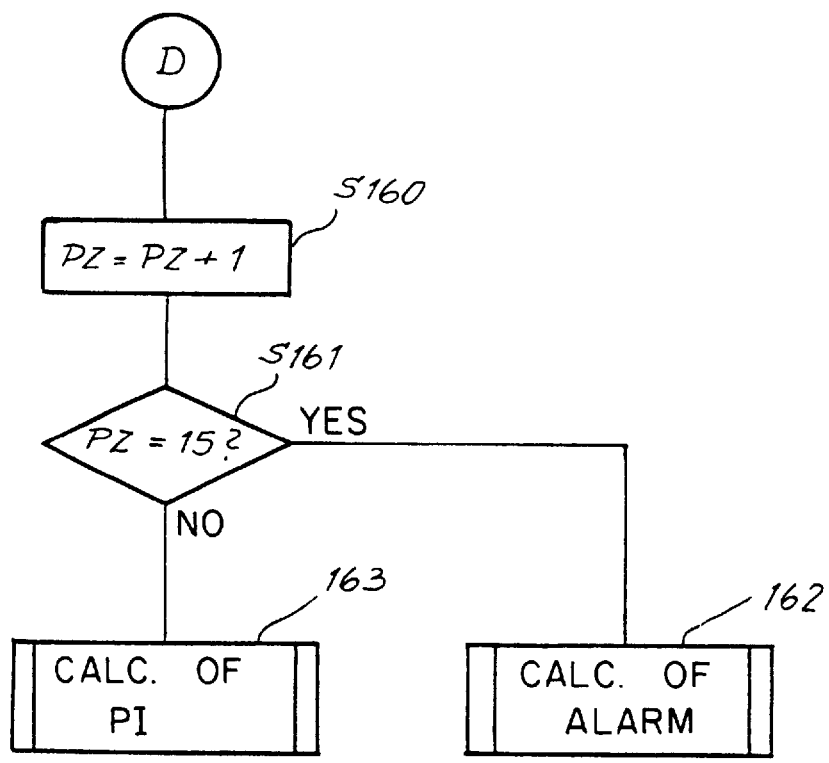
FIG. 18 shows a routine executed after each of the routines of FIGS. 16 and 17.

PZ is the count state of a test counter (comp. to FIG. 18). PZ=15 ensures that a new PI value is calculated immediately after the first measurement, and that an alarm calculation will be carried out later on.

Figure 20:
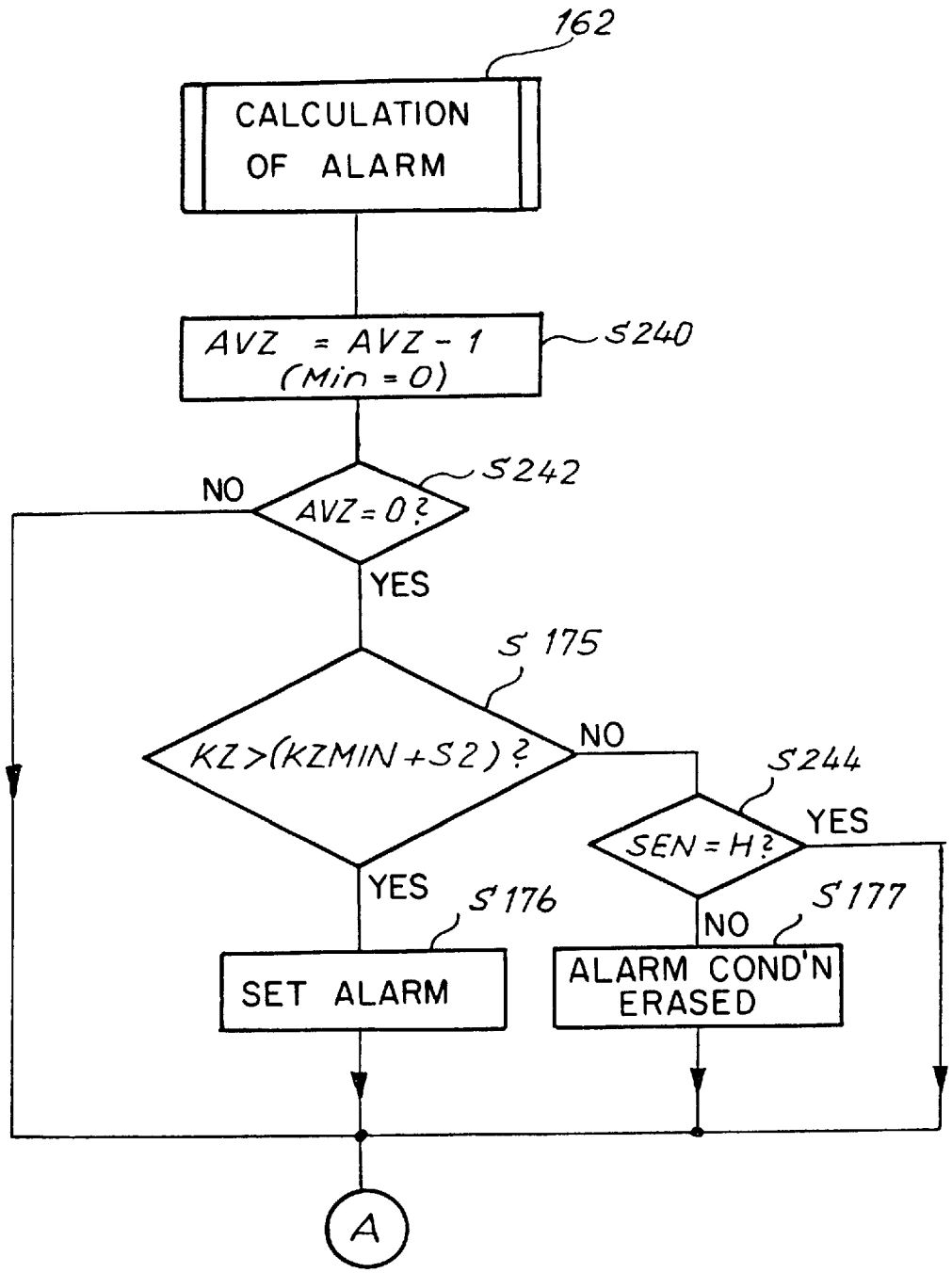
FIG. 20 shows a routine for calculation of an alarm signal.

An alarm delay AVZ has the effect that, e.g., during the first 10 seconds after the start, no ALARM signal can be initiated (comp. to FIG. 20). $U_{difalt}$ is a register quantity that is set to H, if during KOMM=L the value $U_{dif}$=H occurs. It blocks the changing of I and P for KOMM=H but not for KOMM=L. During the start, this value is set to H because the RPM is too low during start, so that P and I must be changed (decreased) for KOMM=L.

Thereafter, microprocessor 20 goes to step S131, a step that is part of every commutation change. In this step, the value D (e.g., 4 units) is deducted from the previously mentioned value KZalt (FIG. 21d), which is generated at every commutation (as the distance between KZ=0 and $t_{30}$, or as the aforementioned moving average that is recalculated at every commutation); the result is the value KZ'alt. This value is entered into the commutation counter KZ as a limit to switch off the current when this value is reached. In addition, in step S131 the commutation counter KZ is reset to Zero and will again start counting from the beginning, i.e., from KZ=0 as shown in FIG. 21d; and the proportional factor P of the controller is set to P=0.

Step S132 checks if the on/off release signal E/A is at a high level. Only then can the motor start running. Otherwise, the program goes back to step S131. In this manner, it is possible to control the motor from a computer.

Step S201 then checks whether the KOMM signal is at a high or a low level. If KOMM=H, the program in step S202 checks whether the signal $U_{difalt}$=H. If this is the case, the program moves to step S203 where a sign signal REG is set to −1, and the program continues with the routine illustrated in FIG. 16. REG=−1 indicates that the RPM is too low, which in turn means that changes to parameters I and P are blocked in the routine of FIG. 16.

If $U_{difalt}$=L, REG is set to +1 in step S204, the program also continues with the routine according to FIG. 16. REG=+1 indicates that the RPM is too high and that the parameters for I and P can be increased according to the measurement value of $T_d$ in the routine of FIG. 16.

If the KOMM signal in step S201 is at L, the program advances to step S205, where $U_{difalt}$ is checked for an H level. If this is the case, REG is set to +1 (RPM too high) in step S206, and the program advances to the routine of FIG. 17. In this condition, changing parameters I and P is blocked.

If the answer in step S205 is No, the program advances to step S207, where REG is set to −1, i.e., the RPM is too low, and the program advances to the routine of FIG. 17, where the parameters for I and P can be decreased according to the measurement value of $T_d$.

Figure 22:
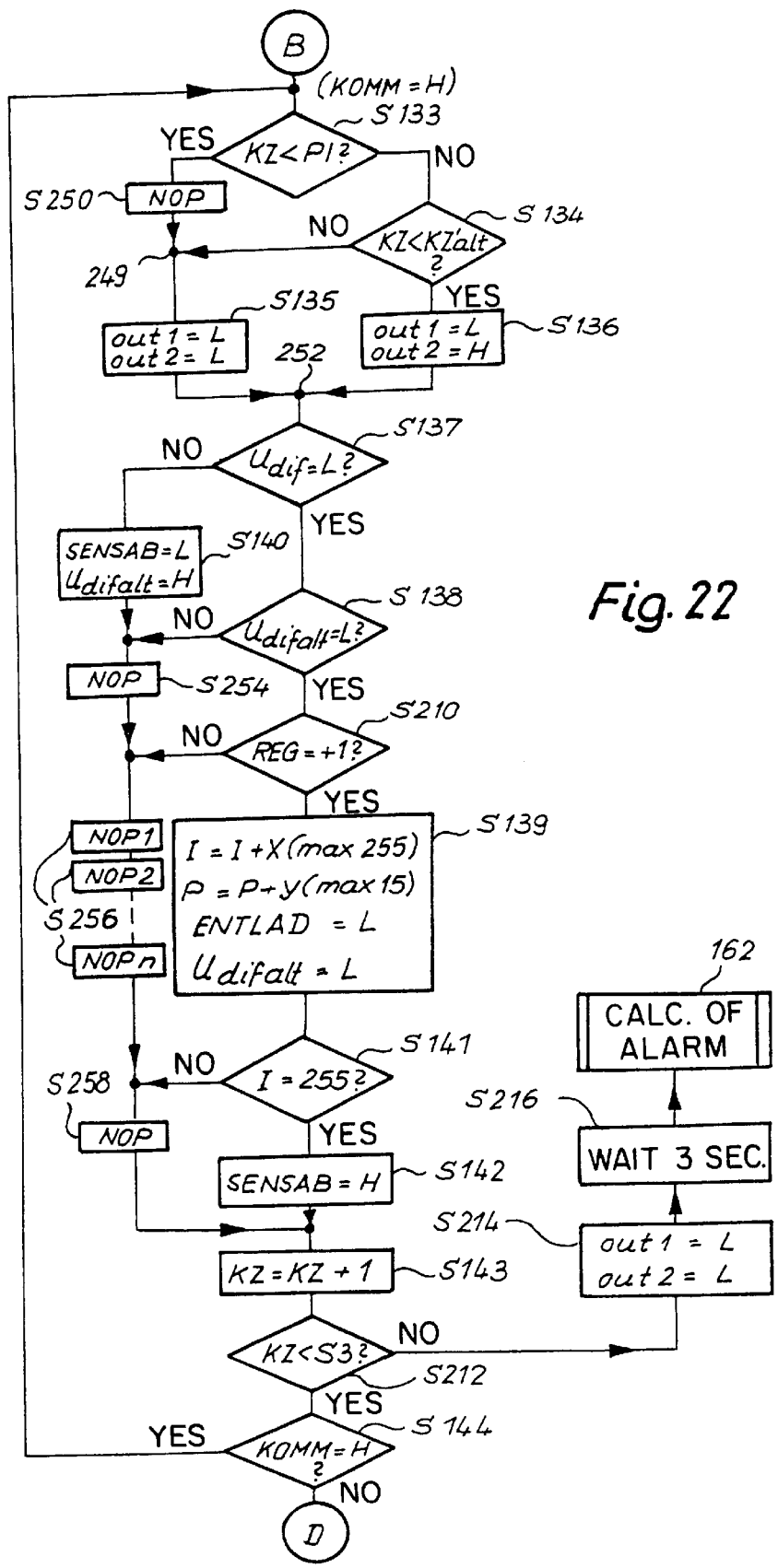
FIG. 22 is a flowchart analogous to FIG. 16, but with NOP-commands inserted.
Figure 23:
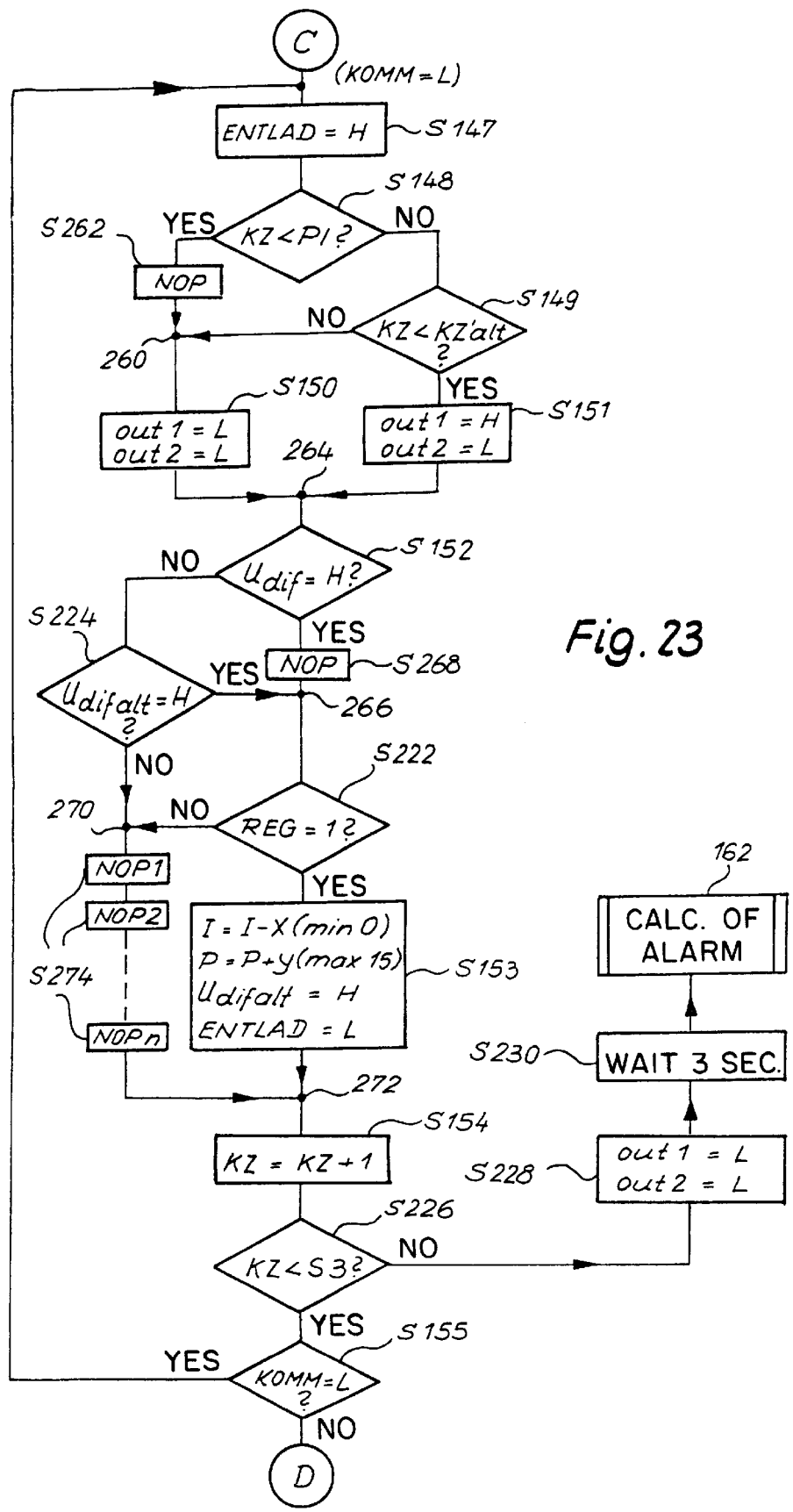
FIG. 23 is a flowchart analogous to FIG. 17, but with NOP-commands inserted.

As a preamble to FIGS. 16 and 17, it should be mentioned that the loops illustrated therein cause a time measurement, namely by changes of the commutation counter KZ (in steps S143 and S154). The prerequisite to this is that each run through a loop, no matter the path, is of equal duration. This is accomplished by filling certain, essentially shorter runs through the loop with NOP commands that simply take up time, but have no effect. These NOP commands are not shown in the flowchart, but should be mentioned here since an optimal function requires that each run through a loop is essentially of the same duration. Thus, the duration of a run through a loop in FIG. 16 corresponds to the duration of a run through a loop in FIG. 17, making the KZ values directly comparable. FIGS. 22 and 23 illustrate these NOP commands.

FIG. 16 illustrates the routine for KOMM=H. This routine implements FIG. 13, if the motor is too fast, i.e., the factors P and I will only be changed (increased) if the motor is too fast.

Step S133 checks whether the commutation counter KZ (in microprocessor 20) has reached the PI value (comp. to Graph 21d). If this is the case, the current $i_2$ will be switched on. Step S134 checks, whether the commutation counter has reached the KZ'alt value and consequently switches current $i_2$ off upon reaching this value.

out2=L means current $i_2$ is switched off.
out2=H means current $i_2$ is switched on.
The same applies to out1.

Therefore, step S135 means both currents $i_1$ and $i_2$ are switched off, and step S136 means current $i_2$ is switched on, i.e., there is a current flow in strand 32.

Step S137 checks whether $U_{dif}$=L (comp. to FIGS. 11d, 11e, and 11f): as long as $U_{dif}$=L, $T_d$ is being measured (for KOMM=H), and the P and I values should therefore be changed in step S139. However, this change only takes place if $U_{difalt}$=L as well (step S138); in other words, if in a check carried out previously the condition "RPM too low" has not been established for KOMM=L. (For RPM too low, the P and I values may be changed only according to the routine of FIG. 17.)

In addition, as a third condition, step S210 checks if REG=+1, and only if this condition is also met will the program advance to step S139, which is the measuring phase where the I and P values are changed during the duration of $T_d$.

If the result of steps S137, S138, and S210 is "Yes", then in step S139 the I factor is increased by a quantity X, e.g., the number 3, and the P factor by a quantity Y, e.g., the number 1. The maximum value for I is 255 and the maximum value for P is 15; the numbers mentioned are used as examples only, so that the material doesn't appear dry. In step S139 $U_{difalt}$ remains at level L. Discharge Register ENTLAD is set to L.

If, in step S137, $U_{dif}$ is at level H indicating that the measurement of $T_d$ is completed (comp. to FIG. 11), then in step S140, $U_{difalt}$ is set to H and SENSAB to L, and the program advances directly to step S143 where the commutation counter KZ is incremented by a value of 1. The same applies when in step S138, $U_{difalt}$=H and when at step S210, REG=−1.

S139 is followed by step S141, which checks whether I=255, i.e., has reached its maximum value. This would indicate the case of FIG. 11g, a sensor break. If this is the case, the register SENSAB is set to H in step S142, which subsequently causes the motor to be switched to the maximum RPM. If I<255, the program advances directly to step S143.

After S142, the commutation counter increments by a value of 1 in step S143.

Thereafter, step S212 checks whether the value reached by the commutation counter KZ (in microprocessor 20) is smaller than a threshold value S3, which may, perhaps, have the value 260. If this is the case, the program advances to step S144. But if KZ exceeds the threshold value S3, which indicates that the motor turns extremely slow or stands still (rotor 27 is blocked), the program goes to step S214, where the currents are switched off in both strands 31 and 32. A waiting time of, e.g. 3 seconds, follows in step S216, i.e., the motor is without current for 3 seconds, and then the program advances to step S162 in FIG. 20, where, if applicable, an alarm is generated. Thereafter, the current to the motor is switched on again, i.e., a new attempt to start the motor is automatically initiated after this approx. 3 sec. waiting period; in this manner, the motor will not overheat but is ready to restart immediately, if the reason for the blocking has disappeared.

If the answer in step S212 is Yes, step S144 subsequently checks whether the KOMM signal has changed. If it is still the same, the program returns to step S133 in a loop. If the KOMM signal has changed, the program advances to the routine of FIG. 18.

FIG. 17 is the continuation of FIG. 15 for the condition of KOMM=L. This routine implements FIG. 12. In it, the measurement procedures, i.e., the changes of I and P, are carried out only when the motor is too slow. FIG. 21 shows the sequences of such a routine.

In step S147, output 13 of microprocessor 20 is set to H, i.e., ENTLAD=H. FIG. 21c illustrates that charging of capacitor C starts at ENTLAD=H causing the voltage $U_c$ (FIG. 21b) to rise. As FIG. 21c illustrates, the ENTLAD signal is set to H at a time difference from the KOMM signal transition (from H to L). This time difference corresponds to the duration of calculation phase 128 (FIG. 21d), which will be explained below using FIGS. 19 and 20. This ENTLAD signal transition from L to H can take place only, if KOMM has previously changed from H to L, i.e., this change is only a part of the routine according to FIG. 17.

Step S148 corresponds to S133.
Step S149 corresponds to S134.
Step S150 corresponds to S135.
Step S151 corresponds to S136, with the difference that at step S151, current $i_1$ is switched on. Reference is made to the corresponding descriptions of these steps for FIG. 16

S152 checks whether $U_{dif}$ is high. This corresponds to Graphs 11b, 11c, and 11d, i.e., $T_d$ is measured from the moment that $U_{dif}$ goes high. If this is the case, step S222 checks subsequently whether REG=−1 (comp. to step S207), i.e., whether the RPM is too slow. If the result is Yes, then in step S153 the integral factor I is reduced by a quantity X (e.g., 3), the proportional factor P is increased by a quantity Y (e.g., 1),, and $U_{difalt}$ is set to H so that subsequently at KOMM=H step S139 is not carried out, and ENTLAD is set to L, i.e., capacitor C is discharged again immediately when $U_c$ reaches the value $U_{58}$, as illustrated in Graphs 21b and 21c. The advantage of this is that sufficient time is available for the discharge across transistor 65 (FIG. 1). Subsequently, signal $U_{difalt}$ is a substitute for signal $U_{dif}$.

When $U_{dif}$ is L, the program goes to step S224, where $U_{difalt}$ is checked as to whether it is at level H. If Yes, the program goes to step S222, if No, to step S154, where the commutation counter KZ increments by a count of 1. Subsequently, step S226 checks whether KZ is smaller than a threshold value S3 (e.g., 260); and if this is the case, the program goes to step S155. If No, it goes to steps S228 and S230, and then to step S162. Step S228 corresponds to S214 of FIG. 16, step S230 corresponds to S216 in FIG. 16. Reference is made to the description of these steps in FIG. 16.

Step S155 checks whether the KOMM signal has changed. If it has not changed, the program returns to step S147. If KOMM has changed, the program advances to the routine of FIG. 18.

FIG. 18 illustrates what happens subsequently to FIG. 16 or FIG. 17. At S160, the test counter PZ (comp. to S130) increments by a count of 1. This counter always counts to 15 and then returns to Zero.

Therefore, step S161 checks, whether PZ=15. If the result is yes, routine 162 for ALARM (FIG. 20) follows; if the result is no, routine 163 (FIG. 19) to calculate the PI value. Both routines are carried out during the calculation phase 128 (Graph 21d), that is immediately following commutation, which causes a minor, but desired, delay in switching on currents $i_1$ and $i_2$. With reference to FIGS. 12 and 13, these routines are always active in the rotational ranges of 0° to approx. 10°, and from 180° to approx. 190°, where motor 25 is to be without current anyhow. It is advantageous for both routines to have the same duration, which can be achieved with the NOP commands mentioned previously.

S164 in FIG. 19 checks whether register SENSAB=H (comp. to S142 in FIG. 16). In this case, the PI value is set to Zero in step S165, which subsequently causes, in the loops of FIG. 16 or 17, the current to already be switched on at KZ=0. This means the motor is running at maximum power and therefore maximum speed. Thus, a sensor break (FIG. 1: break at point 54 or point 55) has the consequence that the motor behaves like a regular motor without speed control.

If, at some time, $U_{dif}$ returns to H, SENSAB will again be set to L (S140 in FIG. 16), and the RPM will again be controlled. If there is no sensor break, the factor P, which has been previously determined, will be multiplied with the sign signal REG, and then the PI value will be calculated according to the following equation:

$$PI=I+2P \qquad \text{(Function of PI: see Graph 21d).}$$

S167 checks whether the factor I is larger than a threshold value S1, e.g., larger than 240. If the result is Yes, the factor I is reset to the value R1, e.g., 208, in step S168. This prevents the alarm from being generated at low RPMs, i.e., the counter for I cannot reach 255 in this case because the resetting procedure artificially keeps its count at a low level. (When I reaches I=255, PI is set to 0, as mentioned, and the motor runs at maximum speed.)

If the factor I is smaller than the threshold value S1, it remains at the same level (step S169).

In the same manner, step S170 checks whether the PI value is negative, and if the result is Yes, PI is reset to Zero in step S171. Otherwise it remains unchanged (S172). Step S173 checks whether the speed falls below the lower limit (FIG. 2: $n_{min}$) and whether the factor I is greater than KZMIN (comp. to S130 in FIG. 15).

If this is not the case, the program returns to step S131. If the speed is lower than $n_{min}$, the controller changes to P control in step S174, i.e., PI is set to two times KZMIN minus KZ. This prevents the RPM n from falling below the lower limit $n_{min}$ (FIG. 2).

The PI value that has been calculated using routine 16 is subsequently used in FIG. 16 and/or FIG. 17, possibly during several successive cycles, as has been described for FIGS. 12 and 13, i.e., the program returns to step S131 also after step S174 (FIG. 15).

FIG. 20 illustrates alarm routine 162. In step S240, the value for alarm delay AVZ is reduced by a count of 1; thereafter, step S242 checks whether AVZ=0. If the result is Yes, the program goes to step S175. This step checks whether KZ is larger than the sum of KZMIN and a threshold value S2, which may have the value 47, for example. This sum may correspond to a speed of, for example, 1200 RPM. If this sum is exceeded, then output 14 ("ALARM") of microprocessor 20 is set to H (step S176), and an alarm is generated. If this sum is not exceeded, the program goes to step S244, which checks whether output 4 (SEN) of microprocessor 20 is high. If Yes, a set alarm will not be deleted, but will remain in storage. If No, the ALARM signal is reset, that is deleted (step S177).

If, in step S242, AVZ is greater than 0 (AVZ has a minimum value of 0), the program returns from there directly to step S131 (FIG. 15); the same applies for SEN=H, and after step S176 or step S177.

As already explained in detail in the preamble to FIGS. 16 and 17, the program loops according to FIGS. 16 and 17 are also used to measure the time, i.e., the loops are designed such that a run through a loop, no matter the path, requires the same amount of time, which enables the loop to be used to measure time. The run times for the loops according to FIG. 16 and according to FIG. 17 are the same, if possible.

This is achieved by inserting NOP (No OPeration) commands at points where otherwise a run through the loop would be too short. (NOP=no operation; a NOP command has no other function than to serve as a time delay of the program sequence. Of course, any other type of command that has no influence on the motor can be used in place of a NOP command.) Use of NOP commands is illustrated in FIGS. 22 and 23. Except for the NOP commands, FIG. 22 is identical to FIG. 16 and FIG. 23 is identical to FIG. 17. The parts already described for FIGS. 16 and 17 will therefore not be described again.

In FIG. 22, a NOP command S250 is inserted between the YES output of step S133 and junction 249. This NOP command has the same duration as step 134. The output signals YES and NO of step S133 have therefore the same run time to junction 252.

A NOP command S254 with the same duration as step S210 is located between the NO output of step S138 and the NO output of step S210.

Several NOP commands S256 with the same duration as step S139 are located between the NO output of step S210 and the NO output of step S139. (A longer delay is achieved by running through several NOP commands 256.)

A NOP command S258 with the same duration as step S142 is located between the NO output of step S141 and the input of step S143.

One can see that the loop according to FIG. 22 takes the same time for each run, independent of the particular steps that are being run through.

Except for the NOP commands, FIG. 23 is identical to FIG. 17. The parts already described for FIG. 17 will therefore not be described again. In FIG. 23, a NOP command S262 with the same duration as step 149 is inserted between the YES output of step S148 and junction 260. The output signals YES and NO of step S148 have therefore the same run time to junction 264.

A NOP command 268 with the same duration as step S224 is located between the YES output of step S152 and junction 266. NOP commands S274 with the same combined duration as step S153 are located between the NO output of step S222, that is junction 270, and output 272 of step S153.

One can see that the loop according to FIG. 23 takes the same time for each run, no matter the path, independent of the particular steps that are being run through.

As has already been explained, a run through the loop according to FIG. 22 takes the same time as a run through the loop according to FIG. 23. If required, this can be achieved by inserting one or more NOP commands between the YES output of step S144 and the input of step S133 in FIG. 22, or alternatively between the YES output of step S155 and the input of step S147 in FIG. 23.

The run times through the loops according to FIGS. 22 and 23 should, of course, be as short as possible. This depends on the clock frequency of microprocessor 20. The following times were registered for the NEC microprocessor 17103GS in use, with a clock frequency of 6 MHz:

Time for a run through a loop according to FIG. 22 or FIG. 23 (50 commands): 133 $\mu$sec Time for a sequence according to FIG. 19 (38 commands): 102 $\mu$s Time for a sequence according to FIG. 20 (35 commands): 93 $\mu$s FIG. 24 is a graphical representation of a run through several loops during the commutation phases. Graph 24a shows the commutation signal KOMM (analogous to Graph 21a), and at instant $t_{270}$ it is assumed that the test counter has reached a count of PZ=13 in FIG. 18, step S160. For this reason, the calculation of the PI value according to FIG. 19 follows in calculation phase 70 (comp. to FIG. 12).

Runs through loops according to FIG. 23 follow after the calculation phase 70, and if, e.g., a value of 1 has been calculated for PI, current $i_1$ is switched on at instant $t_{272}$ after the first run through the loop. The current is switched off after the end of the run through loop (n-x) at instant $t_{274}$, that is before the commutation signal KOMM changes. This has already been described in detail and will, therefore, not be repeated here. In FIG. 24, the quantity x has a value of 1, i.e., current $i_1$ is switched off after the loop that is prior to the last one.

At instant $t_{276}$, the commutation signal changes to H, and in FIG. 18, the test counter reaches a count of PZ=14. In the calculation phase 76 (comp. to FIG. 12), a new PI value is calculated according to FIG. 19, and according to this PI value, current $i_2$ is switched on at instant $t_{278}$, for example, after the first run through the loop according to FIG. 22, if PI has a value of 1. Current $i_2$ is switched off immediately following the run through loop (n-x) at instant $t_{280}$, which occurs prior to the change of the KOMM signal. This has already been described in detail and will, therefore, not be repeated here. (Steps S134 and S135 in FIG. 16; steps S149 and S150 in FIG. 17). Here too, the quantity x has a value of 1, i.e., current $i_2$ is switched off after the loop that is prior to the last one.

At instant $t_{282}$, the KOMM signal (Graph 24a) changes to L, while at the same time the test counter reaches a count of PZ=15 in FIG. 18. This means that the alarm signal will be calculated in the subsequent calculation phase according to FIG. 20. Thereafter another run through the loops occurs according to FIG. 23. The PI value is taken from calculation phase 76 without any changes, as has already been described at FIG. 12.

Commutation counter KZ, therefore, counts the number of loops according to FIG. 22 or FIG. 23 that are run through, and from this result approximates the time distance between successive commutation instants, e.g., between instants $t_{270}$, $t_{276}$, $t_{282}$, etc. Since each loop has a preset duration, the commutation counter KZ essentially measures a time period.

Calculation phases 70, 76, 80, etc. last for a preset time period, i.e., as the motor speed increases, their portion in percent of the time period between two commutation signals (e.g., between $t_{270}$ and $t_{276}$ in FIG. 24) increases, which is advantageous. The calculation phases cause current pauses that are of advantage, particularly in two-pulse motors, especially at high RPMs and, therefore, at high amplitudes of currents $i_1$ and $i_2$. For instance, it is of no consequence, if the amplitude of current $i_1$ in FIG. 24 is so high that the amplitude has not returned to Zero at the commutation instant $t_{276}$, since this current $i_1$ does not have to reach Zero until the end of calculation phase 76, since this is the earliest time that current $i_2$ can be switched on. (Currents $i_1$ and $i_2$ should not flow simultaneously, since this could lead to serious radio interference, to a loud motor, and can decrease motor efficiency. This would also cause high braking torques.) The same applies to current $i_2$, which needs to return to zero only within the period of calculation phase 80.

As already explained by means of a numeric example, the duration of the calculation phases 70, 76, 80, etc. may differ somewhat, depending on whether a PI value (FIG. 19) calculation or an alarm calculation (FIG. 20) is being carried out. The differences in the calculation phase durations are in the range of a few $\mu$sec and do not influence the motor run. If so desired, the calculation phases could be made equal using NOP commands.

The time periods for the runs through the loops according to FIGS. 22 and 23 should, however, be of the same length, since the runs through the loops are counted in the commutation counter KZ, where even small differences will add up during summation and may lead to an uneven run of the motor. For instance, if the difference between a run through a loop acc. to FIG. 22 and a run through a loop acc. to FIG. 23 is 3 μsec, and there are 50 passages through each loop, the time difference becomes 50×3 μsec=150 μsec, which would correspond to a time that is longer than an entire run through a loop. Such errors must be avoided to achieve a quiet run of the motor.

FIG. 25 shows a circuit similar to the one in FIG. 1 designed for maximum RPM, that is without speed control. Input 6 of microprocessor 20 is connected to a minus lead 46 via a resistor 286. This corresponds to a constant value of $U_{dif}=0$, or a break in the line to sensor 26 at point 54 or 55 in FIG. 1. In this case, the motor runs unregulated at maximum speed, i.e., according to step S165 in FIG. 19, PI is set to Zero, and the motor current begins to flow immediately after the end of calculation phase 70, 76, 80, etc. (FIGS. 12 and 24).

However, the other functions of the motor remain unchanged for FIG. 25, i.e., the motor can be switched on and off by a low power signal (step S132 in FIG. 15), the alarm functions operate in the same manner as described according to FIG. 20, and the lock-up safety system operates the same (steps S214, S216 in FIG. 16; steps S228, S230 in FIG. 17). Various alarm speeds can be programmed using inputs NG0 and NG1, as illustrated in FIG. 5. The alarm memory can be programmed using input SEN (FIG. 5) according to FIG. 20, and the alarm delay using input ATS. In this case, microprocessor 20 controls commutation, the lock-up safety system, and alarm monitoring, and speed control can be omitted. Here, the speed of the motor is preset by an operating voltage and the design of the motor winding. Often, this version is sufficient and an inexpensive alternative, particularly with respect to alarm monitoring and lock-up safety, which are both controlled from the microprocessor that controls the motor commutation as well.

Naturally, many variations and modifications are possible. The analog circuit to calculate the control deviation can be replaced by a digitally operating circuit using the same principles. In this case, for example, a counter that provides a signal $U_{dif}$ when a certain temperature-dependent limit is reached may be used as a memory device. The principle remains the same. However, currently the analog method is preferred, since it is very simple and does not require analog-digital converters, for instance for the temperature. Similarly, instead of temperature, one could control a different environmental parameter, e.g. concentration of a gas such as carbon dioxide in a building or carbon monoxide in a tunnel. One could also control for airborne dust concentration.

In the embodiment described above for a two-pole rotor 27, the rotational positions are given in mechanical degrees, e.g., 180°. For a rotor with more than one pair of poles, these values must be replaced by electrical degrees, for instance 180° el. (electrical degrees) in place of 180°, as is common knowledge in the field of electrical engineering.

Various changes and modifications are possible within the scope of the inventive concept. In particular, features of one embodiment may be combined with features of another embodiment.

What is claimed is:

1. A method of controlling the speed of an electronically commutated motor having a rotor, a stator, and an associated capacitor, comprising the steps of:

starting at the occurrence of a first predetermined rotor position, changing the value of a voltage stored on said capacitor beginning from a predetermined value, as a function of time;

comparing said voltage value with another quantity and generating a reference signal ($U_{dif}$) when a result of said comparing step satisfies a predetermined reference criterion;

re-setting the voltage on said capacitor to said predetermined value during a time interval between the generation of said reference signal and the beginning of a subsequent voltage changing step;

measuring the absolute value and sign of a difference in time between the beginning of the reference signal ($U_{dif}$) and the completion of rotation of said rotor through a predetermined angle of rotation subsequent to the first predetermined rotor position, determining whether said difference in time is indicative of rotation speed below a target rotation speed or indicative of rotation speed above said target rotation speed; and controlling the current through at least one winding phase of said stator based on the value and sign of said difference in time ($T_d$, $T_{d'}$) and the result of said determining step.

2. The method according to claim 1, wherein said step of re-setting the voltage on the capacitor to a predetermined value is performed upon occurrence of either one of the following events:

a) directly after generation of the reference signal ($U_{dif}$);

b) when a predetermined rotor position coincides in time with the presence of the reference signal ($U_{dif}$).

3. The method according to claim 1, wherein said step of changing said voltage as a function of time is started whenever a predetermined rotor position or whenever any one of a plurality of predetermined rotor positions is reached.

4. The method according to claim 1, further comprising the step of during said step of measuring said difference in time ($T_d$, $T_{d'}$), changing at least one control parameter, to adapt said control parameter to the measured difference in time ($T_d$, $T_{d'}$) and to the result of said determining step, such that, after the elapse of this difference in time ($T_d$, $T_{d'}$), an updated parameter will be available for controlling the rotational speed of the motor.

5. The method according to claim 4, wherein within a first rotational angle range of the rotor at least one parameter is changed when the rotational speed of the motor is too high; and within a second rotational angle range which differs from the first rotational angle range, the at least one control parameter is changed when the motor speed is too low.

6. The method according to claim 4, wherein the at least one control parameter is changed at the end of a commutation cycle if the motor speed is too low, and at the beginning of a commutation cycle if the motor speed is too high.

7. The method according to claim 1, wherein said electronically commutated motor has less than three winding phases, calculations are carried out for the calculation of at least one of:

a control parameter for a control process, and an alarm signal indicating that motor speed is too low, within at least one predetermined rotational position range of the rotor, while at least one winding phase of the motor is without current.

8. The method according to claim 7, wherein different calculations are carried out in said predetermined rotational position range at different times, that is, one time the calculation of a control parameter, and another time testing to see if the motor speed is too low, in which case an alarm is generated.

9. A method of controlling an electronically commutated motor having a stator, at least one winding phase, a permanent magnet rotor, and rotor position sensing means for producing a commutation signal information after each predetermined angle of rotor rotation, comprising the following steps:
   a) obtaining a commutation time value (KZalt) from one of
      loading an arbitrary commutation time value (Kzalt) stored in a memory, and
      determining a commutation time value (Kzalt) substantially corresponding to a time period between a preceding commutation signal information and a present commutation signal information;
   b) based on said obtained commutation time value, making an estimate of a first future point in time at which a subsequent commutation time signal is likely to occur by assuming that the distance of said subsequent commutation signal information from the present commutation signal information will correspond to said obtained commutation time value;
   c) making an estimate of a second future point in time by subtracting, from said first estimated point in time, a value corresponding to a predetermined length of time (D), said second future point in time (KZ'alt) being closer to the present commutation signal information than said first future point in time; and
   d) switching off energization of an energized winding phase when said second point in time (KZ'alt) is reached so that said energization is interrupted before said subsequent commutation signal information appears.

10. The method according to claim 9, wherein the predetermined length of time is constant.

11. The method according to claim 9, wherein the predetermined length of time is controlled by the output of a speed controller.

12. The method according to claim 9, wherein the switching off process of the current flow is delayed at output transistors provided for controlling current flow through the winding phases.

13. A method of regulating the rotational speed of an electronically commuted motor having a rotor, a stator, and a control circuit adapted to recognize, and to respond to,
   a predetermined speed-too-low condition and
   a predetermined speed-too-high condition, comprising the following steps:
   a) Responsive to a speed-too-low condition, first control steps are carried out at least partially in at least one first predetermined rotational position range of the rotor;
   b) Responsive to a speed-too-high condition, second control steps are carried out at least partially in at least one second predetermined rotational position range of the rotor,
   the second rotational position range being different from the first rotational position range.

14. The method according to claim 13, wherein steps common to respective responses to a speed-too-high condition and a speed-too-low condition are carried out during at least a third predetermined rotational position range of said rotor,
   the third rotational position range being different from the first and from the second rotational position ranges of said rotor.

15. The method of controlling, using integral control, the rotational speed of an electronically commutated motor having a rotor and a stator, as a function of a temperature value, according to claim 1, wherein
   the quantity of the integral factor of the integral control or of a proportional integral control is reset to a lower value when exceeding a limit, when the motor speed is low as a result of a low temperature value.

16. The method according to claim 1, wherein
   the rotational speed of the motor is controlled to a higher value when the measured difference in time ($T_d$) corresponds to approximately the time interval between two commutation instants, when measuring said difference in time ($T_d$) between the completion of rotation of said rotor through the predetermined angle of rotation subsequent to the first predetermined rotor portion and the beginning of said reference signal ($U_{dif}$) occurring subsequent to said completion.

17. The method according to claim 1, wherein responsive to said commutation time value exceeding a predetermined value, the motor is switched to a non-speed-controlled mode at maximum speed.

18. A method for monitoring the speed of an electronically commutated motor having a rotor, a stator comprising a stator winding, and a control circuit controlling current flowing in said stator winding,
   said control circuit successively executing, in operation, program loops of predetermined duration, comprising the following steps:
   a) counting, beginning substantially at a first rotational position of said rotor, and ending substantially at a point in time when said rotor has rotated through a predetermined angle from said first rotational position, how many program loops have been executed;
   b) monitoring continuously the count of said program loops executed, by program elements contained in said loop;
   c) interrupting motor current for a predetermined time interval when said count exceeds a predetermined value,; and
   d) attempting to restart the motor after the predetermined time interval has elapsed.

19. The method according to claim 18, wherein,
   after expiration of the predetermined time interval, an alarm signal is set.

20. The method according to claim 18, wherein
   said monitoring step comprises continuously monitoring the elapsed time for the commutation phases for more than one winding phase, and
   comparing each elapsed time with the predetermined value.

21. A method of regulating the rotational speed of an electronically commutated DC motor having a rotor, a stator, and a control circuit which identifies when each commutation of said motor occurs and executes appropriate program loops in response thereto, wherein
   during a commutation phase, a program loop of a predetermined time duration is run more than once, and each run is counted in a loop counter, and
   said program loop of predetermined duration includes a measuring algorithm which measures a difference in time ($T_d$, $T_{d'}$) corresponding to a control deviation.

22. A method of controlling an electronically commutated DC motor having a rotor, a stator, and a programmable control circuit which identifies when a commutation of said motor occurs and executes program loops in response thereto, wherein during a commutation phase, a program loop of a predetermined time duration is run more than once, and each run is measured in a loop counter, and the loop counter controls at least one process within the course of a commutation phase.

23. The method according to claim 22, wherein said program loop of predetermined duration includes a measuring algorithm which measures a difference in time ($T_d$, $T_{d'}$) corresponding to a control deviation.

24. The method according to claim 23, wherein the measuring algorithm comprises steps of adjusting a control parameter according to the measured difference in time ($T_d$, $T_{d'}$).

25. The method according to claim 23, wherein the measuring algorithm is contained in the program loop as a branch being passed through only during the duration of the difference in time ($T_d$, $T_{d'}$).

26. The method according to claim 25, wherein the steps contained in the program loop are so arranged and selected that the time needed for running through a program loop is essentially independent of whether or not the branch routine is executed.

27. An electronically commutated DC motor comprising a stator, a rotor, and a control circuit for controlling its rotational speed of said motor, comprising:

a) A capacitor, means for changing a voltage on said capacitor as a function of time, means for starting said voltage change when a first, predetermined rotational position of the rotor is reached;

b) a comparator, where this voltage is compared to a predetermined second voltage to produce a reference signal ($U_{dif}$) when a predetermined reference criterion is satisfied;

c) a measuring component to measure the difference in time (+$T_d$, −$T_d$, $T_{d'}$) between the beginning of this reference signal ($U_{dif}$) and the attainment of a second predetermined rotational position of the rotor;

d) a calculation component, for influencing the time a stator current serving to drive the motor is switched, according to at least one predetermined rule and, based on the magnitude of the difference in time ($T_d$, $T_{d'}$) and on whether the attainment of the second predetermined rotational position of the rotor occurred before or after the beginning of said reference signal; and e) means for resetting the voltage on said capacitor to an initial value after the changing of said voltage as a function of time is terminated.

28. The motor according to claim 27, wherein the capacitor is reset to an initial value either directly after the start of the reference signal or when a predetermined rotor position coincides with the presence of the reference signal.

29. The motor according to claim 27, wherein the predetermined rotor position is a commutation position whereat a signal dependent on the rotational position and serving to control the motor, changes for the purpose of commutation.

30. The motor according to claim 27, wherein the first predetermined rotational position of the rotor is a first commutation position, and the second predetermined rotational position of the rotor is the commutation position directly following the first commutation position.

31. The motor according to claim 29, wherein the first predetermined rotational position of the rotor is a commutation position at which the signal serving to control the motor changes in a predetermined manner.

32. An electronically commutated DC motor having a control circuit controlling current flowing in said motor and successively executing, in operation, program loops each having substantially the same predetermined duration;

a loop counter counting said loops approximately beginning at a first rotational position of said rotor and ending substantially at a point in time when said rotor has rotated through a predetermined angle from said first rotational position;

a comparing step in said loop which continuously compares a count value in said loop counter to a predetermined threshold value; and an alarm generator, actuatable by said comparing step, which generates an alarm signal when the count value in said loop counter exceed said predetermined threshold value.

33. A method of monitoring the speed of an electronically commutated DC motor having a stator and a rotor, comprising the following steps:

a) repeatedly and successively executing, as said rotor is rotating through a predetermined rotational angle range relative to said stator, a program loop of predetermined duration and containing steps controlling said motor;

b) starting substantially at the beginning of said rotational angle range, and ending substantially at the end thereof, counting the number of said program loops executed, and monitoring continuously the thus-obtained count value obtained as the rotor rotates through said rotational angle range; and c) when said count value exceeds a predetermined threshold value, generating an alarm signal.

34. The method according to claim 22, wherein said process controlled by the loop counter includes switching on a current.

35. The method according to claim 22, wherein said process controlled by the loop counter includes cutting off a current.

36. The method according to claim 22, wherein said process controlled by the loop counter includes monitoring rotational speed.

37. The method according to claim 9, wherein said commutation time determining step comprises counting how many program loops of constant duration are performed by a microcontroller in said motor between two successive commutation signals.

38. The method according to claim 9, wherein said monitoring comprises the steps of counting how many program loops of constant duration are executed by a microcontroller in said motor until a loop count in reached which substantially corresponds to said reduced commutation time value (KZ'alt); and switching off current through the respective winding phase when said loop count is reached.

39. The method according to claim 9, further comprising providing, after switching on said motor, an initial value for said commutation time value (KZalt).

40. The method according to claim 9, further comprising providing, after switching on said motor, an initial value for said second future point in time (KZ'alt).

* * * * *

UNITED STATES PATENT AND TRADEMARK OFFICE
CERTIFICATE OF CORRECTION

PATENT NO. : 5,845,045
DATED : December 1, 1998
INVENTOR(S) : Jeske et al.

It is certified that error appears in the above-identified patent and that said Letters Patent is hereby corrected as shown below:

On the title page, item[56]:

OTHER PUBLICATIONS

R. Mu(R+D Director, Papst-Motoren), should read

--R. Müller(R+D Director, Papst-Motoren),--.

References Cited Page 2

5,867,155 9/1989 Isaacson should read

--4,867,155--.

In column 22, line 23, "re-setting" should be

--resetting--.

Signed and Sealed this

Fifteenth Day of June, 1999

Attest:

Q. TODD DICKINSON

Attesting Officer

Acting Commissioner of Patents and Trademarks